US012754804B2

(12) United States Patent
Shetty et al.

(10) Patent No.: US 12,754,804 B2
(45) Date of Patent: *Oct. 6, 2026

(54) METHODS AND MULTI-SITE SYSTEMS TO PROVIDE RECOVERY POINT OBJECTIVE (RPO) PROTECTION, SNAPSHOT RETENTION BETWEEN SECONDARY STORAGE SITE AND TERTIARY STORAGE SITE, AND AUTOMATICALLY INITIATING REALIGNMENT AND RECONFIGURATION OF A PROTECTION CONFIGURATION FROM THE SECONDARY STORAGE SITE TO THE TERTIARY STORAGE SITE UPON PRIMARY STORAGE SITE FAILURE

(71) Applicant: NetApp, Inc., San Jose, CA (US)

(72) Inventors: Sohan Shetty, Bangalore (IN); Akhil Kaushik, San Jose, CA (US)

(73) Assignee: NetApp, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/977,281

(22) Filed: Dec. 11, 2024

(65) Prior Publication Data

US 2025/0110837 A1 Apr. 3, 2025

Related U.S. Application Data

(63) Continuation of application No. 18/160,557, filed on Jan. 27, 2023, now Pat. No. 12,197,291.

(51) Int. Cl.

*G06F 11/1446* (2026.01)
*G06F 3/06* (2006.01)
*G06F 11/20* (2006.01)

(52) U.S. Cl.

CPC .......... *G06F 11/1458* (2013.01); *G06F 3/065* (2013.01); *G06F 11/2066* (2013.01)

(58) Field of Classification Search

CPC ............. G06F 11/1446; G06F 11/1458; G06F 11/1461; G06F 11/1469; G06F 11/1658;

(Continued)

(56) References Cited

U.S. PATENT DOCUMENTS 7,225,307 B2 * 5/2007 Micka ................. G06F 11/2076 714/E11.107
7,685,385 B1 3/2010 Choudhary et al.

(Continued)

OTHER PUBLICATIONS

Non-Final Office Action mailed on Apr. 5, 2024 for U.S. Appl. No. 18/160,568, filed Jan. 27, 2023, 10 pages.

(Continued)

*Primary Examiner* — Gabriel Chu

(74) *Attorney, Agent, or Firm* — Jaffery Watson Hamilton & DeSanctis LLP

(57) ABSTRACT

Multi-site distributed storage systems and computer-implemented methods are described for providing common snapshot retention and automatic fanout reconfiguration for an asynchronous leg after a failure event that causes a failover from a primary storage site to a secondary storage site. A computer-implemented method comprises providing an asynchronous replication relationship with an asynchronous update schedule from one or more storage objects of the first storage node to one or more replicated storage objects of the third storage node, creating a snapshot copy of the one or more storage objects of the first storage node, transferring the snapshot copy to the third storage node based on an asynchronous mirror policy, and intercepting the snapshot create operation on the primary storage site and transferring the snapshot copy to the second storage node to provide a common snapshot between the second storage node and the third storage node.

20 Claims, 19 Drawing Sheets

(58) Field of Classification Search
CPC ............. G06F 11/1662; G06F 11/2041; G06F 11/2053; G06F 11/2056; G06F 11/2058; G06F 11/2064; G06F 11/2066; G06F 11/2069; G06F 11/2074; G06F 11/2076; G06F 11/2082; G06F 2201/84; G06F 3/065; H04L 67/1095
See application file for complete search history.

(56) References Cited

U.S. PATENT DOCUMENTS

| | | | | |
|---|---|---|---|---|
| 8,407,182 | B1 | 3/2013 | Rajaa et al. | |
| 8,677,088 | B1 | 3/2014 | Patil | |
| 8,719,220 | B2 | 5/2014 | Kawaguchi | |
| 8,874,508 | B1 | 10/2014 | Mittal | |
| 11,132,271 | B2 | 9/2021 | Ward et al. | |
| 11,200,207 | B1 | 12/2021 | Lew et al. | |
| 11,256,586 | B2 * | 2/2022 | Satoyama | G06F 11/2097 |
| 11,436,097 | B1 | 9/2022 | Kumar et al. | |
| 11,657,019 | B2 * | 5/2023 | Xu | G06F 11/2041 707/639 |
| 11,803,571 | B2 | 10/2023 | Thomas et al. | |
| 12,164,396 | B2 | 12/2024 | Shetty et al. | |
| 12,197,291 | B2 | 1/2025 | Shetty et al. | |
| 2005/0251633 | A1 | 11/2005 | Micka et al. | |
| 2006/0218210 | A1 | 9/2006 | Sarma et al. | |
| 2014/0195482 | A1 | 7/2014 | Kaiser et al. | |
| 2016/0378625 | A1 | 12/2016 | Aizer et al. | |
| 2017/0242599 | A1 | 8/2017 | Patnaik et al. | |
| 2018/0181321 | A1 | 6/2018 | Van Assche et al. | |
| 2018/0239535 | A1 | 8/2018 | Wilkinson | |
| 2020/0026627 | A1 | 1/2020 | Chen et al. | |
| 2020/0125738 | A1 | 4/2020 | Mahatwo et al. | |
| 2020/0127937 | A1 | 4/2020 | Busick et al. | |
| 2021/0034569 | A1 | 2/2021 | Xu et al. | |
| 2021/0334181 | A1 | 10/2021 | Satoyama et al. | |
| 2021/0382799 | A1 | 12/2021 | Kawaguchi | |
| 2022/0245172 | A1 * | 8/2022 | Thomas | G06F 16/273 |
| 2022/0398163 | A1 | 12/2022 | Bezbaruah et al. | |
| 2023/0046983 | A1 * | 2/2023 | Gunasekaran | G06F 3/0659 |
| 2023/0342061 | A1 | 10/2023 | Yang et al. | |
| 2025/0086072 | A1 | 3/2025 | Shetty et al. | |

OTHER PUBLICATIONS

Notice of Allowance mailed on Aug. 7, 2024 for U.S. Appl. No. 18/160,568, filed Jan. 27, 2023, 07 pages.
Notice of Allowance mailed on Dec. 19, 2024 for U.S. Appl. No. 18/160,557, filed Jan. 27, 2023, 02 pages.
Notice of Allowance mailed on Oct. 28, 2024 for U.S. Appl. No. 18/160,568, filed Jan. 27, 2023, 04 pages.
Notice of Allowance mailed on Sep. 11, 2024 for U.S. Appl. No. 18/160,557, filed Jan. 27, 2023, 09 pages.
Non-Final Office Action mailed on Nov. 28, 2025 for U.S. Appl. No. 18/958,785, filed Nov. 25, 2024, 36 pages.
Final Office Action mailed on Apr. 21, 2026 for U.S. Appl. No. 18/958,785, filed Nov. 25, 2024, 39 pages.

* cited by examiner

Initial State

After 1 hour
Sync schedule triggers
followed by async

After 2 hours
Async schedule triggers
followed by sync

Initial State

Async schedule triggers
New snap A2 created on A
and replicated to B and C

Sync schedule triggers New
CSS snap S3 created

Async schedule triggers
New snap A3 created

Dst Rel RDB table 1280

| Rel | Src Dblade ID | Src dsid |
|---|---|---|
| C1 | ~~A1~~ B1 | ~~201~~ 301 |
| C2 | ~~A1~~ B1 | ~~202~~ 302 |
| C3 | ~~A1~~ B1 | ~~203~~ 303 |

METHODS AND MULTI-SITE SYSTEMS TO PROVIDE RECOVERY POINT OBJECTIVE (RPO) PROTECTION, SNAPSHOT RETENTION BETWEEN SECONDARY STORAGE SITE AND TERTIARY STORAGE SITE, AND AUTOMATICALLY INITIATING REALIGNMENT AND RECONFIGURATION OF A PROTECTION CONFIGURATION FROM THE SECONDARY STORAGE SITE TO THE TERTIARY STORAGE SITE UPON PRIMARY STORAGE SITE FAILURE

CROSS-REFERENCE TO RELATED APPLICATIONS

This application is a continuation of U.S. patent application Ser. No. 18/160,557, filed Jan. 27, 2023, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright @ 2023, NetApp, Inc.

FIELD

Various embodiments of the present disclosure generally relate to multi-site distributed data storage systems. In particular, some embodiments relate to methods and multi-site systems to provide recover point objective (RPO) protection, snapshot retention between a secondary storage site and a tertiary storage site, and automatic realignment and reconfiguration of a protection configuration between the secondary storage site and the tertiary storage site upon a failure event of a primary storage site.

DESCRIPTION OF THE RELATED ART

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise. Failures handled manually with user intervention require additional time to restore operations of the business enterprise.

SUMMARY

Multi-site distributed storage systems and computer-implemented methods are described for providing RPO protection, common snapshot retention, and automatic fanout reconfiguration for one or more asynchronous legs after a failure event that causes a failover from a primary storage site to a secondary storage site. A computer-implemented method comprises providing a synchronous replication relationship with a first update schedule from one or more storage objects of the first storage node to one or more replicated storage objects of the second storage node; providing an asynchronous replication relationship with a second update schedule from the one or more storage objects of the first storage node to one or more replicated storage objects of the third storage node; creating a snapshot copy of the one or more storage objects of the first storage node based on the second update schedule; transferring the snapshot copy to the third storage node based on an asynchronous mirror policy; and intercepting the snapshot create operation on the primary storage site and transferring the snapshot copy to the second storage node to provide a common snapshot between the second storage node and the third storage node to avoid a baseline data transfer from the second storage node to the third storage node if a failover occurs from the primary storage node to the secondary storage node.

In another embodiment, a computer-implemented method provides automatic fanout reconfiguration for one or more asynchronous legs of a fanout topology after a failure event that causes a failover from a primary storage site to a secondary storage site performed by one or more processors of a multi-site distributed storage system with a primary storage site having a first storage node, a secondary storage site having a second storage node, and a tertiary site having a third storage node. The method comprises providing a synchronous replication relationship from one or more storage objects of the first storage node to one or more replicated storage objects of the second storage node, providing an asynchronous replication relationship or mirror vault policy with an asynchronous update schedule from the one or more storage objects of the first storage node to one or more replicated storage objects of the third storage node to provide a protection configuration, tracking, with the third storage node of the tertiary site, a state of the secondary storage site, automatically performing a failover from the primary storage site to the secondary storage site and activating a synchronous mirror copy for the one or more replicated storage objects of the second storage node based upon detecting the failure event for the primary storage site, and automatically initiating realignment and reconfiguration of the protection configuration to the tertiary storage site based upon the state of the secondary storage site.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 12E illustrates establishing of an asynchronous leg 1270 with an asynchronous relationship from site B to site C while FIG. 12F illustrates updating a destination relationship RDB table 1280 with site C now being a destination for site B as a source.

DETAILED DESCRIPTION

Figure 1:
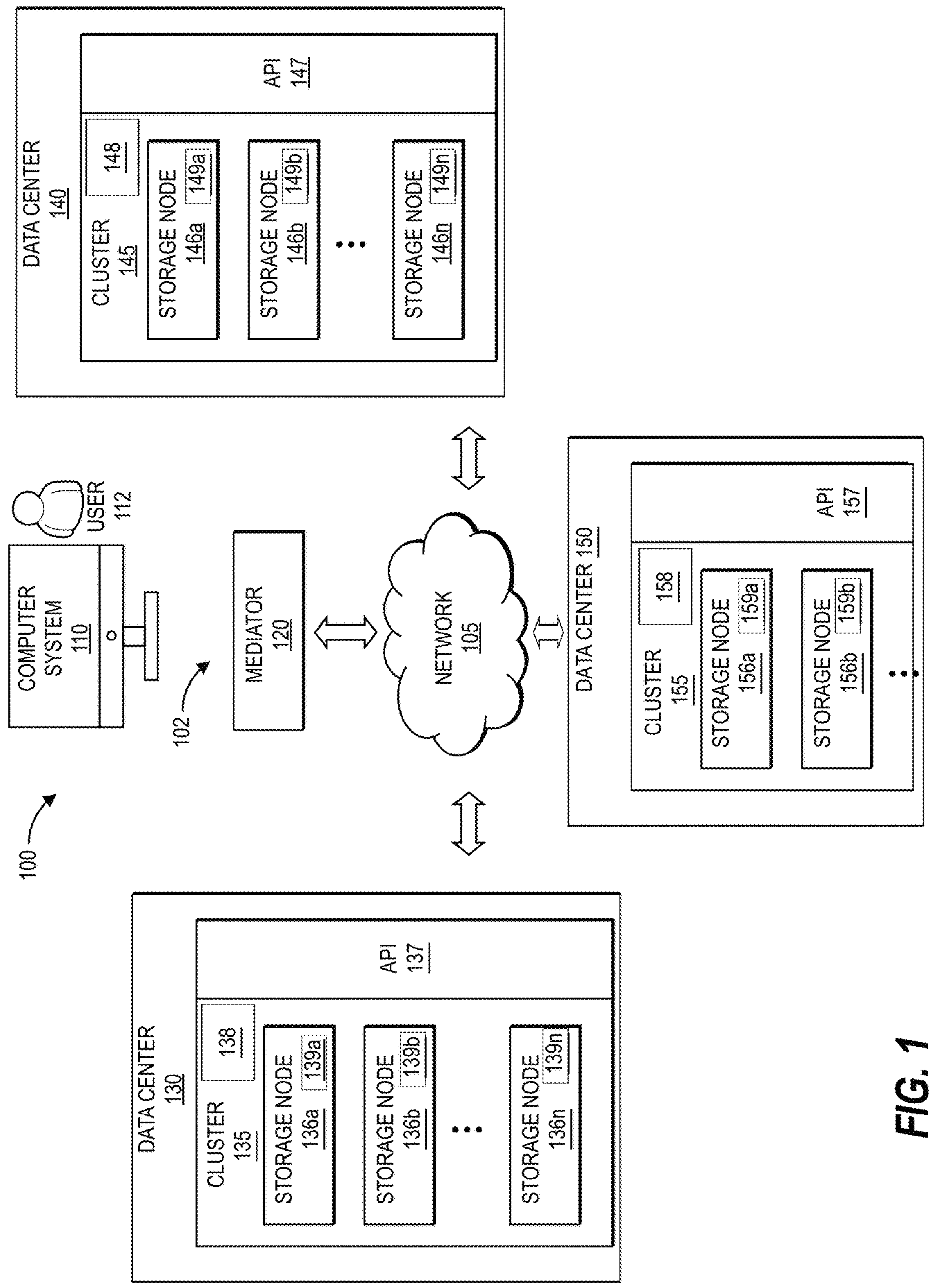
FIG. 1 is a block diagram illustrating an environment in which various embodiments may be implemented.

Multi-site distributed storage systems and computer-implemented methods are described for providing non-zero recover point objective (RPO) protection and snapshot retention between a secondary storage site and a tertiary storage site upon a failure event of a primary storage site. In one example, the primary storage site and secondary storage site are located in relatively close proximity (e.g., less than 100 km, proximity based on round trip time guarantees for synchronous replication datasets) and the tertiary storage site is located at a greater distance. In another example, one or more of the storage sites (e.g., one storage site, two storage sites, three storage sites) can be located in a private or public cloud, accessible (e.g., via a web portal) to an administrator associated with a managed service provider and/or administrators of one or more customers of the managed service provider, includes a cloud-based, monitoring system provided that network connectivity is suitable for synchronous replication between the two synchronous replicated copies. Furthermore, other combinations for the storage sites are included in this present design, for example, one storage site on premise and two storage sites in the cloud and other such variants. The three site topology is applicable to cloud-resident workloads and datasets as well. For a fully cloud resident dataset, two sites can be in the same region (e.g., same availability zone (AZ) or different AZs with sync replication being a limit to a distance between the two sites) and the third site can be in a different region (e.g., a long distance dataset copy) or even an on premise data center. Availability zones (AZs) are isolated data centers located within specific regions in which public cloud services originate and operate. Cloud computing businesses typically have multiple worldwide availability zones. A cloud-resident workload is an application, service, capability, or a specified amount of work that consumes cloud-based resources (e.g., computing or memory power). Databases, containers, microservices, VMs, and Hadoop nodes are examples of cloud workloads.

A synchronous data replication from a primary copy of data of a consistency group (CG) at a primary storage system at a first site (primary storage site) to a secondary copy of data at a secondary storage system of a second site (secondary storage site) can fail due to many reasons including inter cluster connectivity issues. These issues can occur if the secondary storage site can not differentiate between the primary storage site being down, in isolation, or just a network partition. A trigger for the automated failover is generated from a data path and if the data path is lost, can lead to disruption. For example, if the primary storage site is not operational or is isolated (e.g., network partition leading to both inter cluster connectivity and connectivity to an external Mediator are lost), then a data replication relationship (or relationship) between the primary and secondary storage sites guarantees non-disruptiveness due to allowing I/O operations to be handled with the secondary mirror copy of data of the second site.

Synchronous replication securely protects enterprise application data by generating a mirror image of the data in a logical volume, logical unit number (LUN), and/or consistency group of LUNs, or volumes to a remote storage system at a physically separate location. This protection means that in case of any kind of outage, revenue-producing applications continue to serve business functions from the secondary remote storage system, which instantly takes over operations from the primary storage system. When a Synchronous replicated relationship for a synchronous replicated dataset is In-Sync, an active file system (AFS) is being constantly modified on both a source data set of the primary storage system because of active I/O and a destination data set of the secondary storage system because of synchronous replication. Thus, AFS can diverge over time from a last common snapshot taken by the asynchronous transfer phase. Note that recovering from out-of-sync involves async transfer based on common snapshot. The more the AFS is divergent from the common snapshot, the more the time it takes to complete the async transfer and more the recovery time to come back In-Sync. To alleviate this problem, Sync Replication will periodically create Common Snapshots. This helps auto resync to transfer less delta data in case the relationship falls Out-of-Sync as the Common Snapshots will be new.

A snapshot is a point in time image of a storage object (e.g., storage volume) in question. Thus, once a snapshot is taken, nothing about the contents of that snapshot change, including any content metadata. The image consumes minimal storage space and incurs negligible performance overhead because it records only changes to files since the last Snapshot copy was made. A Snapshot policy defines how the system creates Snapshot copies of volumes. The policy specifies when to create the Snapshot copies, how many copies to retain, how to name them, and how to label them for replication.

A common snapshot workflow will start with preventing or fencing I/O operations (ops) from being processed on the primary storage system and draining the inflight ops to establish a sync point. The common snapshot workflow will then issue requests on the primary storage system and the secondary storage system so that snapshots containing the same data can be taken. The I/O ops are then resumed. The resultant snapshots are deemed common snapshots between primary and secondary storage systems.

Business enterprises may prefer to set up synchronous mirroring protection on a secondary storage site for their primary data store on a primary storage site in conjunction with a tertiary copy in a tertiary storage site to form a 3-site fan-out topology. In one example, sync replication is established for two sync replicated sites within a limited distance (e.g., primary and secondary storage site within 100 kilometers or less of each other) and therefore a 3-site protection is a standard deployment practice. The tertiary or third storage site can be located at a greater distance (e.g., greater than 100 kilometers) or be a cloud entity. Now this third site could be a disaster recovery (DR) site set up with an asynchronous DR policy or a Backup site (e.g., long-term retention of snapshots) set up with an asynchronous Vault based policy. The 3rd site as a vault is predominant in synchronous replication deployments.

In cases of the primary storage site experiencing a failure event and not being able to handle I/O operations, the sync mirror secondary storage site can act as a recovery site to continue I/O operations for the applications (e.g., business enterprise applications, database applications, email applications). It would also be desirable to continue long term vault retention or asynchronous mirroring to the tertiary copy of the dataset on the third storage site in this scenario.

The three site topology experiences the following technical problems. If the sync mirror copy at the secondary storage site and the vault/async mirror copy at the third storage site do not maintain a common snapshot with each other at all times, then resumption of protection to the third storage site will need a time consuming and network bandwidth intensive baseline data transfer for all files of the sync mirror copy of the secondary storage site to the third storage site.

Upon failure of the primary storage site, then the third storage site having an asynchronous relationship with the primary storage site, will not be able to reach the primary storage site and the asynchronous relationship between the first storage site and the third storage site will fail.

Various embodiments of the present disclosure may include one or more of the following technical effects, advantages, and/or improvements for addressing the above technical problems: (i) implementing an asynchronous mirroring policy to ensure the sync mirror copy at the secondary storage site and the vault/async mirror copy at the third storage site maintain a common snapshot with each other at all times. This enables resumption of protection to the third storage site without the need for a baseline data transfer from the sync mirror copy to the vault/async mirror copy, (ii) detect a failure event at the primary storage site, track with the third site a state of the secondary storage site, perform an automatic unplanned failover (AUFO) from the primary storage site to the secondary storage site and activate a synchronous mirror copy for the second storage object based upon detecting the failure event for the primary storage site and the AUFO, and automatically initiating realignment and reconfiguration of a protection configuration from the secondary storage site to the tertiary storage site based upon the state of the secondary storage site.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

An AFS is a file system (e.g., Write Anywhere File Layout) in use, excluding its Snapshot copies. An aggregate is a grouping of physical storage resources (e.g., disks or array LUNs that provide storage to volumes associated with the aggregate. Aggregates provide the ability to control the RAID configuration for all associated volumes.

Mirror protection is a periodic exact mirroring of all volume data (both active and protected) from a source storage system to a destination storage system. If data in the source storage system is lost or made unavailable (e.g., if the source storage system is damaged), then that same data can quickly be made available from the destination mirror site. Mirror operations are employed from primary to secondary storage and from secondary to tertiary storage, in circumstances where secure mirroring of that data, and in event of breakdown at the source site, quick availability of that data from a second site might be required.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135, 145, and 155 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, a data center 150, and optionally a mediator 120. The data centers 130, 140, 150, the mediator 120, and the computer system 110 are coupled in communication via a network 105, which, depending upon the particular implementation, may be a Local Area Network (LAN), a Wide Area Network (WAN), or the Internet.

The data centers 130, 140, and 150 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130, 140, and 150 may represent a colocation data center in which a company rents space of a facility owned by others and located off the company premises. The data centers are shown with a cluster (e.g., cluster 135, cluster 145, cluster 155). Those of ordinary skill in the art will appreciate additional IT infrastructure may be included within the data centers 130, 140, and 150. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center. The cluster 155 of data center 150 can have an asynchronous relationship or be a vault retention of the cluster 135 of the data center 130.

Turning now to the cluster 135, it includes a configuration database 138, multiple storage nodes 136*a-n* each having a respective mediator agent 139*a-n*, and an Application Programming Interface (API) 137. In the context of the present example, the multiple storage nodes 136*a-n* are organized as a cluster and provide a distributed storage architecture to service storage requests issued by one or more clients (not shown) of the cluster. The configuration database may store configuration information for a cluster. A configuration database provides cluster wide storage for storage nodes within a cluster. The data served by the storage nodes 136*a-n* may be distributed across multiple storage units embodied as persistent storage devices, including but not limited to HDDs, SSDs, flash memory systems, or other storage devices. In a similar manner, cluster 145 includes a configuration database 148, multiple storage nodes 146*a-n* each having a respective mediator agent 149*a-n*, and an Application Programming Interface (API) 147. In the context of the present example, the multiple storage nodes 146*a-n* are organized as a cluster and provide a distributed storage architecture to service storage requests issued by one or more clients of the cluster. Turning now to the cluster 155, it includes a configuration database 158, multiple storage nodes 156*a-b* each having a respective mediator agent 159*a-b*, and an Application Programming Interface (API) 157.

The API 137 may provide an interface through which the cluster 135 is configured and/or queried by external actors (e.g., computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only three data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
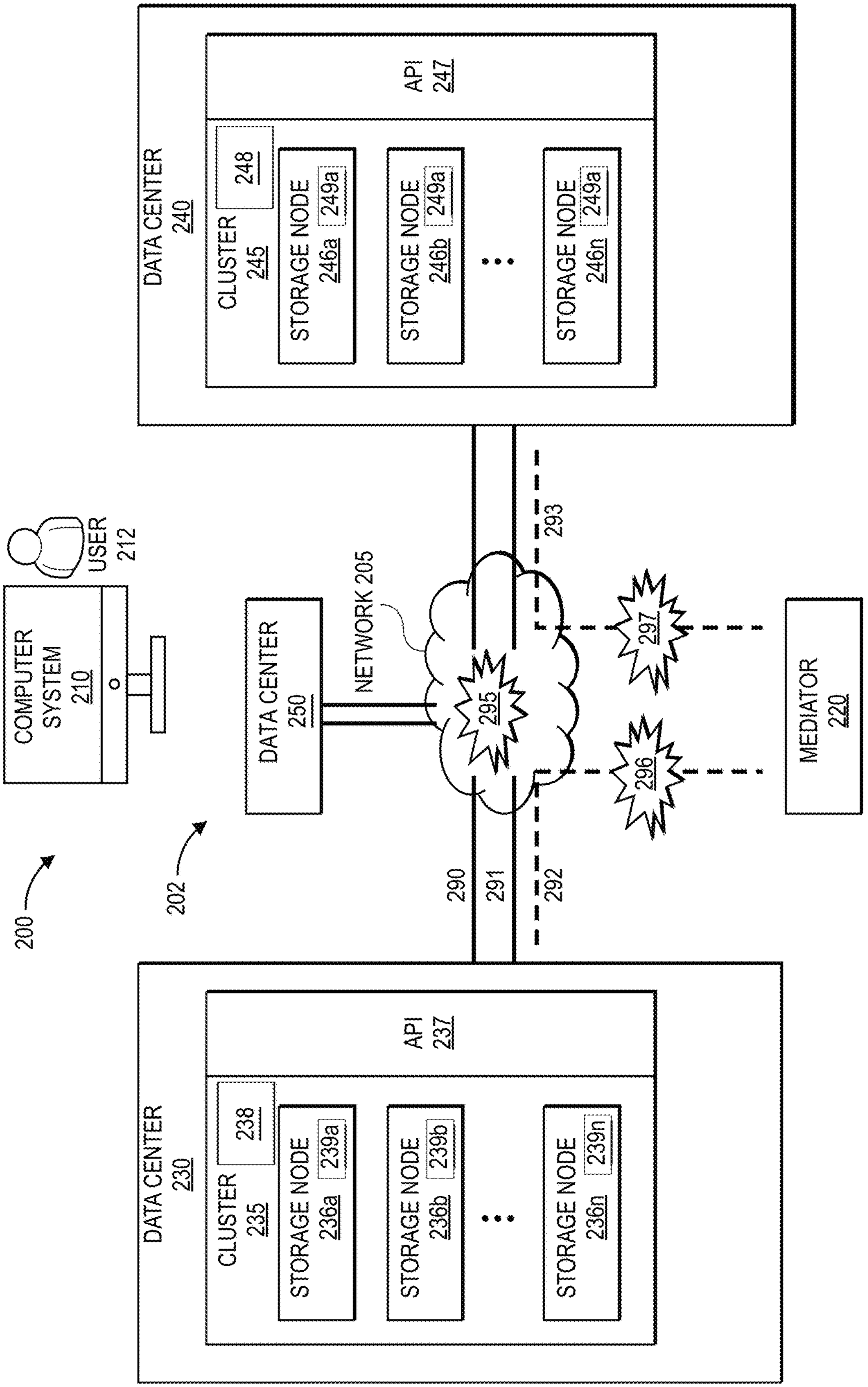
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, a data center 250, and optionally a mediator 220. The data centers 230, 240, and 250, the mediator 220, and the computer system 210 are coupled in communication via a network 205, which, depending upon the particular implementation, may be a Local Area Network (LAN), a Wide Area Network (WAN), or the Internet.

The data centers 230, 240, and 250 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230, 240 and 250 may represent a colocation data center in which a company rents space of a facility owned by others and located off the company premises. The data centers 230 and 240 are shown with a cluster (e.g., cluster 235, cluster 245). The data center 250 includes similar components as data centers 230 and 240. Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes a configuration database 238, at least two storage nodes 236*a-b*, optionally includes additional storage nodes (e.g., 236*n*) and an Application Programming Interface (API) 237. The storage nodes 236*a-n* each include a respective mediator agent 239*a-n*. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes a configuration database 248, at least two storage nodes 246*a-b*, optionally includes additional storage nodes (e.g., 246*n*) and includes an Application Programming Interface (API) 247. The storage nodes 246*a-n* each include a respective mediator agent 249*a-n*. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

A synchronous replication from a primary copy of data at a primary storage site (e.g., cluster 235) to a secondary copy of data at a secondary storage site (e.g., cluster 245) can fail due to inter cluster or cluster to mediator connectivity issues (e.g., failures 295, 296, 297). These issues can occur if the secondary storage site can not differentiate between the primary storage site being non-operational (or isolation), or just a network partition. A trigger for the automated failover is generated from a data path and if the data path is lost, this can lead to disruption. A data replication relationship between the primary and secondary storage sites guarantees non-disruptiveness due to allowing I/O operations to be handled with the secondary mirror copy of data. However, there are timing windows between the primary storage site being non-operational and the secondary mirror copy being ready to serve I/O operations where a second failure can lead to disruption. For example, a controller failure in a cluster hosting the secondary mirror copy of the data. The automatic unplanned failover feature of the present design guarantees non-disruptive operations (e.g., operations of business enterprise applications, operations of software application) even in the presence of these multiple failures.

In one example, each cluster can have up to 5 consistency groups with each consistency group having up to 12 volumes. The system 202 provides an automatic unplanned failover feature at a consistency group granularity. The unplanned failover feature allows switching storage access from a primary copy of the data center 230 to a mirror copy of the data center 240 or vice versa.

Figure 3:
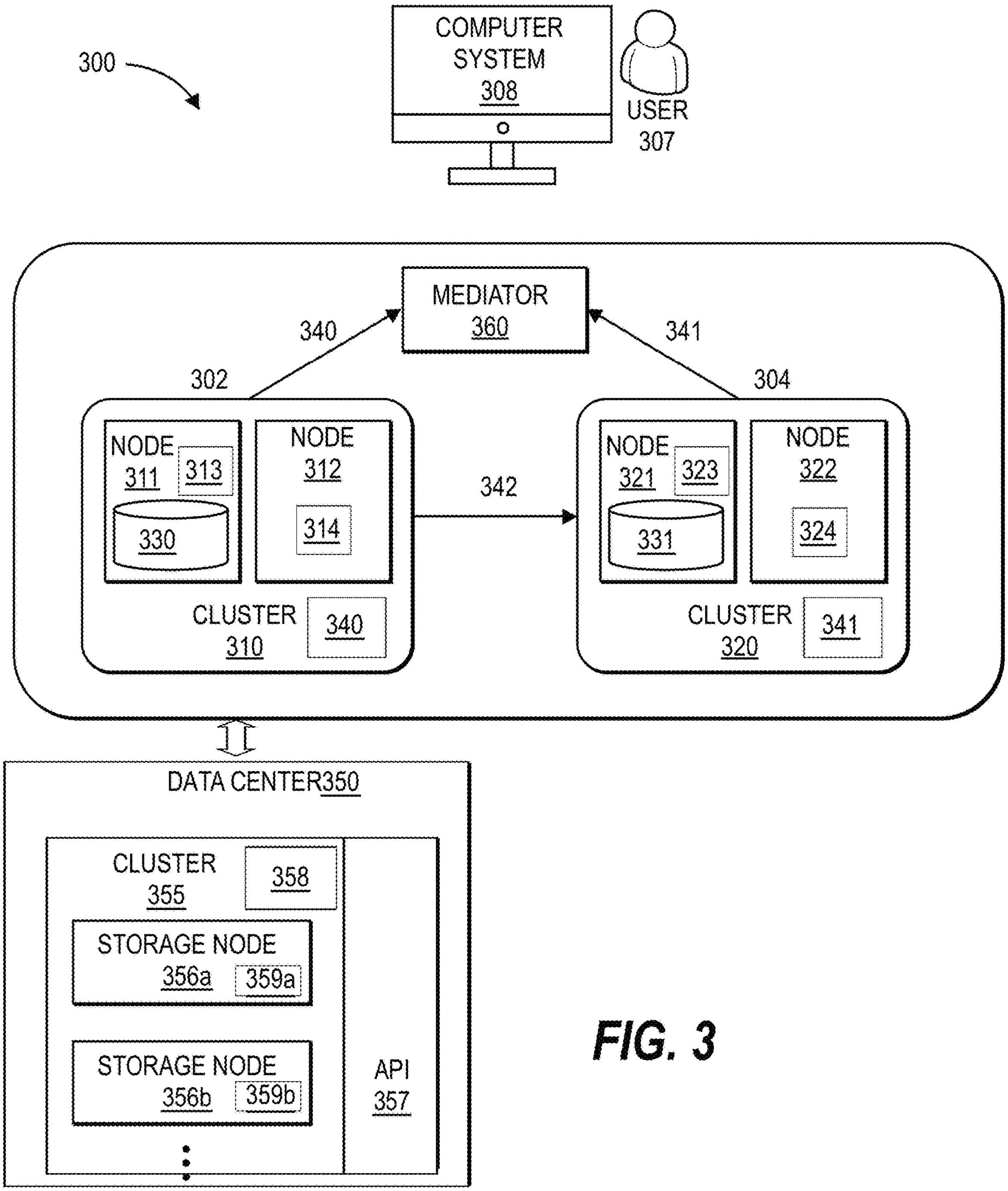
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 307) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, a data center 350 having a cluster 355, and a mediator 360. The clusters 310, 320, 355, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312, the cluster 320 includes nodes 321 and 322, and the cluster 355 includes nodes 356*a* and 356*b*. In one example, the cluster 320 has a data copy 331 that is a mirrored copy of the data copy 330 to provide non-disruptive operations at all times even in the presence of multiple failures including, but not limited to, network disconnection between the data centers 302 and 304 and the mediator 360. The cluster 355 may have an asynchronous replication relationship with cluster 310 or a mirror vault policy. The cluster 355 includes a configuration database 358, multiple storage nodes 356*a-b* each having a respective mediator agent 359*a-b*, and an Application Programming Interface (API) 357.

The multi-site distributed storage system 300 provides correctness of data, availability, and redundancy of data. In one example, the node 311 is designated as a leader and the node 321 is designated as a follower. The leader is given preference to serve I/O operations to requesting clients and this allows the leader to obtain a consensus in a case of a race between the clusters 310 and 320. The mediator 360 enables an automated unplanned failover (AUFO) in the event of a failure. The data copy 330 (leader), data copy 331 (follower), and the mediator 360 form a three way quorum. If two of the three entities reach an agreement for whether the leader or follower should serve I/O operations to requesting clients, then this forms a strong consensus.

The leader and follower roles for the clusters 310 and 320 help to avoid a split-brain situation with both of the clusters simultaneously attempting to serve I/O operations. For example, the leader may become unresponsive while a mediator detects this unresponsiveness to be a leader non-operational situation. The leader being non-operational can potentially cause a race between leader and follower copy both simultaneously attempting to obtain a consensus. However, only one of the leader and the follower should win the race and then be allowed to handle I/O operations. If this race is not prevented, it can result in the split-brain situation.

There are scenarios where both leader and follower copies can claim to be a leader copy. In one example, a follower cannot serve I/O until an AUFO happens. A leader doesn't serve I/O operations until the leader obtains a consensus.

The mediator agents (e.g., 313, 314, 323, 324, 359*a*, 359*b*) are configured on each node within a cluster. The system 300 can perform appropriate actions based on event processing of the mediator agents. The mediator agent(s) processes events that are generated at a lower level (e.g., volume level, node level) and generates an output for a consistency group level. In one example, the nodes 311, 312, 321, and 322 form a consistency group. The mediator agent provides services for various events (e.g., simultaneous events, conflicting events) generated in a business data replication relationship between each cluster.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (leader) while operations received by the node 321 (follower) are proxied to node 311.

Example Storage Node

Figure 4:
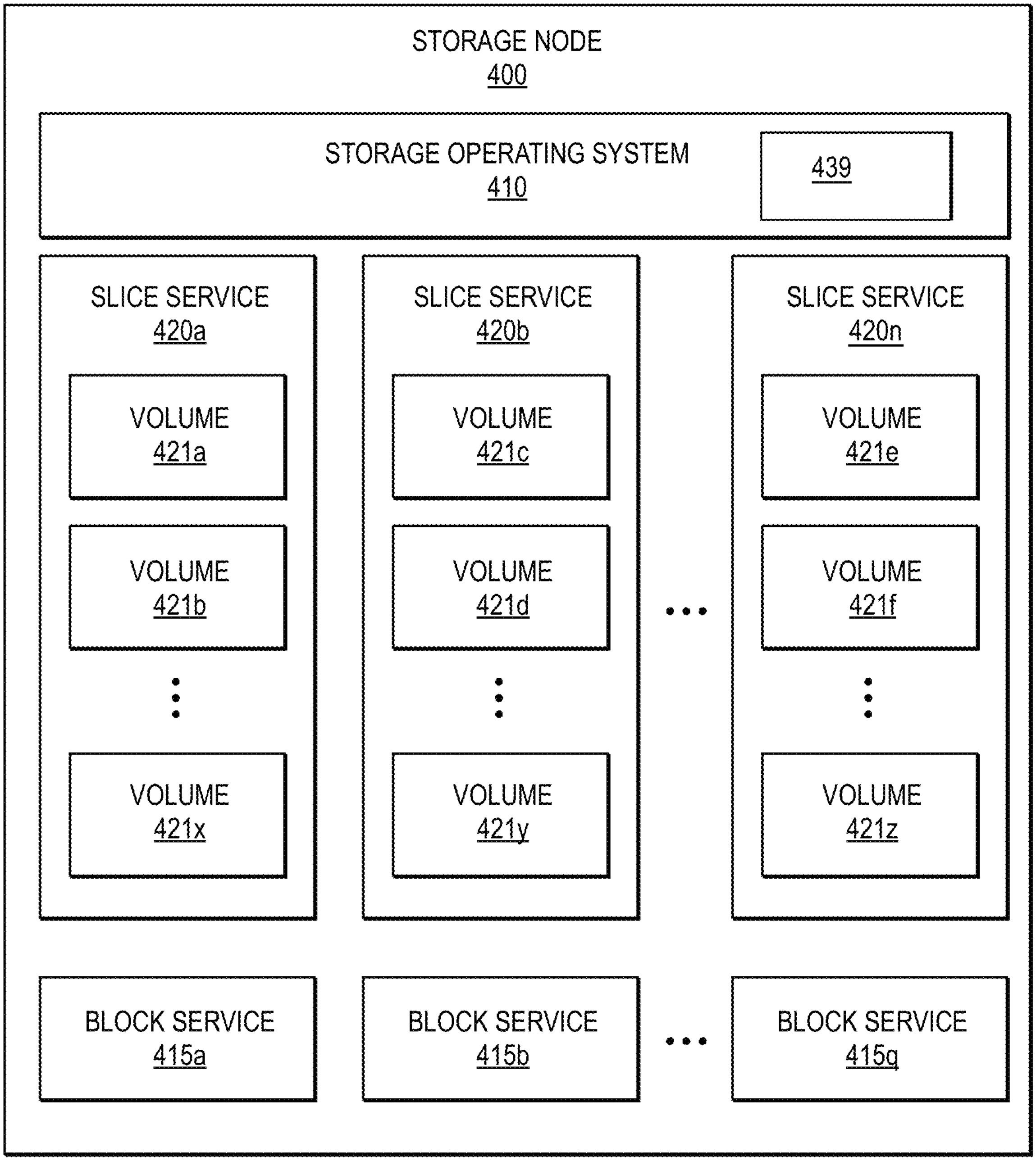
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136*a-n*, 146*a-n*, 236*a-n*, 246*a-n*, 311, 312, 321, 322) described herein. In the context of the present example, a storage node 400 may be a network storage controller or controller that provides access to data stored on one or more volumes. The storage node 400 includes a storage operating system 410, a mediator agent 439, one or more slice services 420*a-n*, and one or more block services 415*a-q*. The mediator agent 439 can be separate or integrated with the storage operating system 410. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421*a-x*, volumes 421*c-y*, and volumes 421*e-z*). Client systems (not shown) associated with an enterprise may store data to one or more volumes, retrieve data from one or more volumes, and/or modify data stored on one or more volumes.

The slice services 420*a-n* and/or the client system may break data into data blocks. Block services 415*a-q* and slice services 420*a-n* may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420*a-n* may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415*a-q* and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

In one example, a storage node includes a large number of volumes (e.g., 200 volumes) and a high availability pair of nodes includes 200 volumes per node.

Figure 5A:
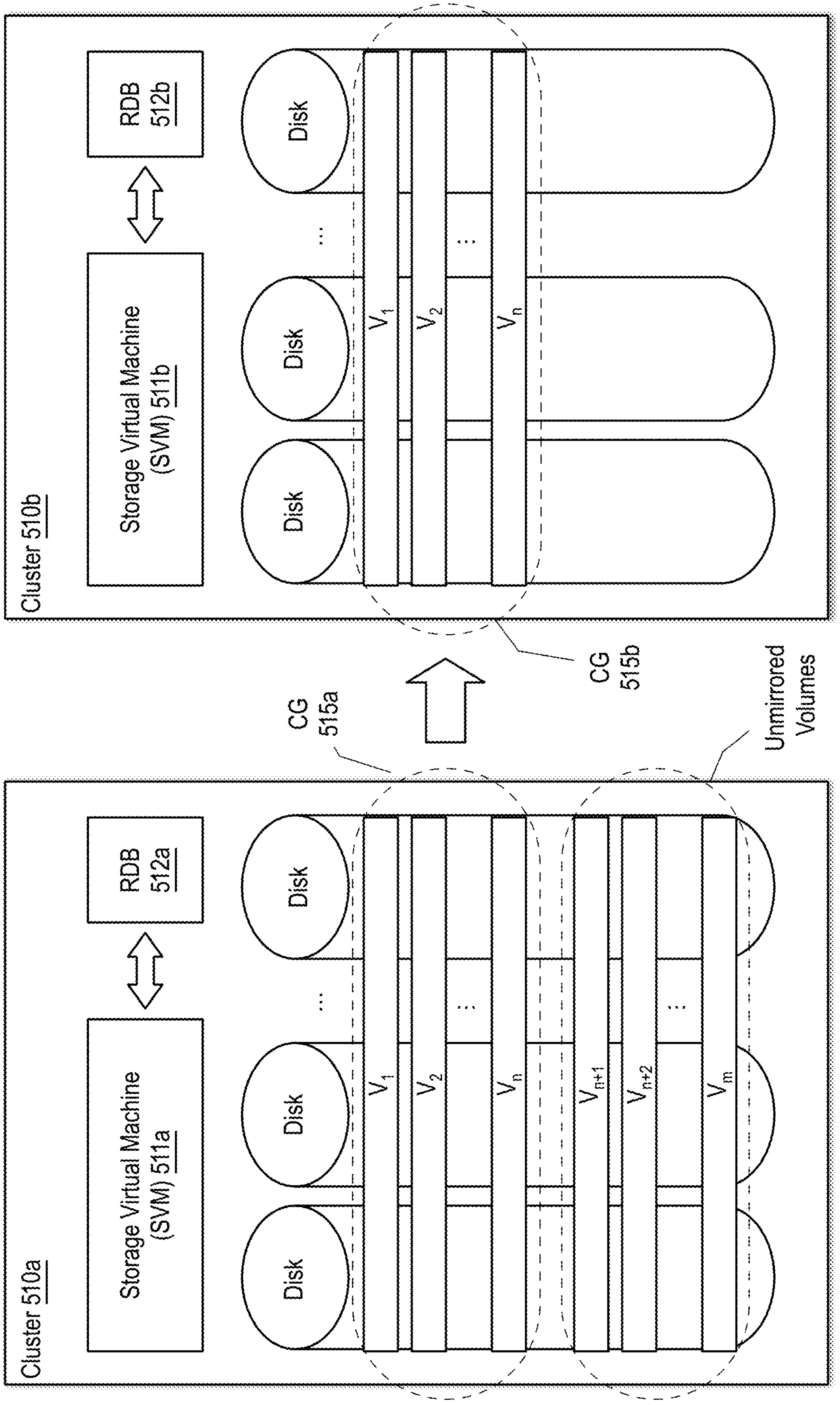
FIG. 5A is a block diagram illustrating the concept of a consistency group (CG) in accordance with an embodiment.

FIG. 5A is a block diagram illustrating the concept of a consistency group (CG) in accordance with an embodiment. In the context of the present example, a stretch cluster including two clusters (e.g., cluster 510*a* and 510*b*) is shown. The clusters may be part of a cross-site high-availability (HA) solution that supports zero recovery point objective (RPO) and zero recovery time objective (RTO) by, among other things, providing a mirror copy of a dataset at a remote location, which is typically in a different fault domain than the location at which the dataset is hosted. For example, cluster 510*a* may be operable within a first site (e.g., a local data center) and cluster 510*b* may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 515*a* or CG 515*b*). A CG is a collection of storage objects or data containers (e.g., volumes) within a cluster that are managed by a Storage Virtual Machine (e.g., SVM 511*a* or SVM 511*b*) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515*a* may be referred to as a local CG from the perspective of cluster 510*a* and as a remote CG from the perspective of cluster 510*b*. Similarly, CG 515*a* may be referred to as a remote CG from the perspective of cluster 510*b* and as a local CG from the perspective of cluster 510*b*. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512*a* and 512*b*), which may store configuration information for their respective clusters. A configuration database provides cluster wide storage for storage nodes within a cluster. The configuration information may include relationship information (e.g., relationship information of a data replication relationship) specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115*b*) to which data is configured to be synchronously replicated may be referred to as being in the role of a destination CG, whereas the CG (e.g., CG 515*a*) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a consistency group may be described as performing certain actions (e.g., taking other members of a consistency group out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or leader cluster to a secondary or follower cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (leader) cluster is stored on more than one secondary (follower) cluster.

Figure 5B:
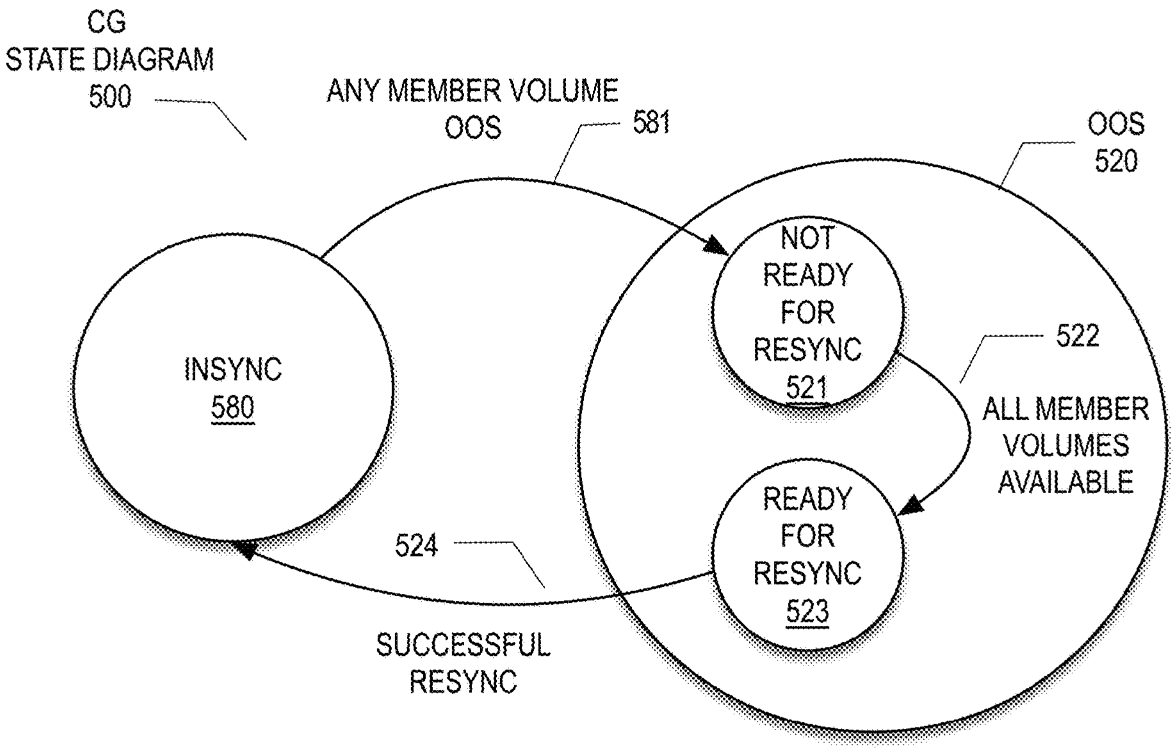
FIG. 5B is a CG state diagram 600 in accordance with an embodiment of the present disclosure.

FIG. 5B is a CG state diagram 500 in accordance with an embodiment of the present disclosure. In the context of the present example, the data replication status of a CG can generally be in either of an InSync state (e.g., InSync 580) or an OOS state (e.g., OOS 520). Within the OOS state, two sub-states are shown, a not ready for resync state 521 and a ready for resync state 523.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512*a* or 512*b*).

As noted above, in various embodiments described herein, the members (e.g., volumes) of a CG are managed as a single unit. In the context of the present example, the data replication status of a given CG is dependent upon the data replication status of the individual member volumes of the CG. A given CG may transition 581 from the InSync state to the not ready for resync state 521 of the OOS state responsive to any member volume of the CG becoming OOS with respect to a peer volume with which the member volume is peered. A given CG may transition 522 from the not ready for resync state 521 to the ready for resync state 523 responsive to all member volumes being available. In order to support recovery from, among other potential disruptive events, manual planned disruptive events (e.g., balancing of CG members across a cluster) a resynchronization process is provided to promptly bring the CG back into the InSync state from the OOS state. Responsive to a successful CG resync, a given CG may transition 524 from the ready for resync state 523 to the InSync state.

Although outside the scope of the present disclosure, for completeness it is noted that additional state transitions may exist. For example, in some embodiments, a given CG may transition from the ready for resync state 523 to the not ready for resync state 521 responsive to unavailability of a mediator (e.g., mediator 120) configured for the given CG. In such an embodiment, the transition 522 from the not ready for resync state 521 to the ready for resync state 523 should additionally be based on the communication status of the mediator being available.

Figure 5C:
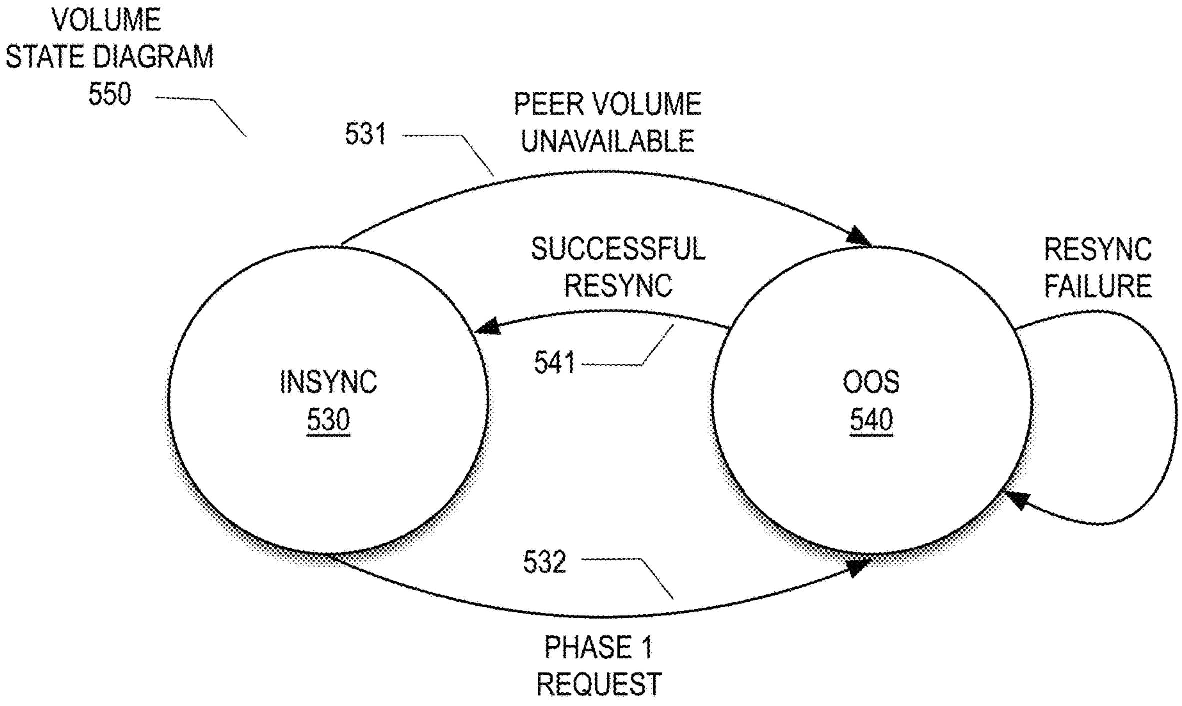
FIG. 5C is a volume state diagram 650 in accordance with an embodiment of the present disclosure.

FIG. 5C is a volume state diagram 550 in accordance with an embodiment of the present disclosure. In the context of the present example, the data replication status of a volume can be in either of an InSync state (e.g., InSync 530) or an OOS state (e.g., OOS 540). While a given volume of a local CG (e.g., CG 515*a*) is in the InSync state, the given volume may be said to be in-synchronization with a peer volume of a remote CG (e.g., CG 515*b*) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512*a* or 512*b*).

A given volume may transition 531 from the InSync state to the OOS state responsive to a peer volume being unavailable. A given volume may transition 532 from the InSync state to the OOS state responsive to a phase one request. A given volume may transition 541 from the OOS state to the InSync state responsive to a successful resynchronization with the peer volume. As described below in further detail, in one embodiment, dependent write-order consistency of the mirror copy is preserved by responsive to any member volume of a given CG detecting it has gone OOS for any reason (e.g., a network failure), driving all member volumes OOS.

Figure 6A:
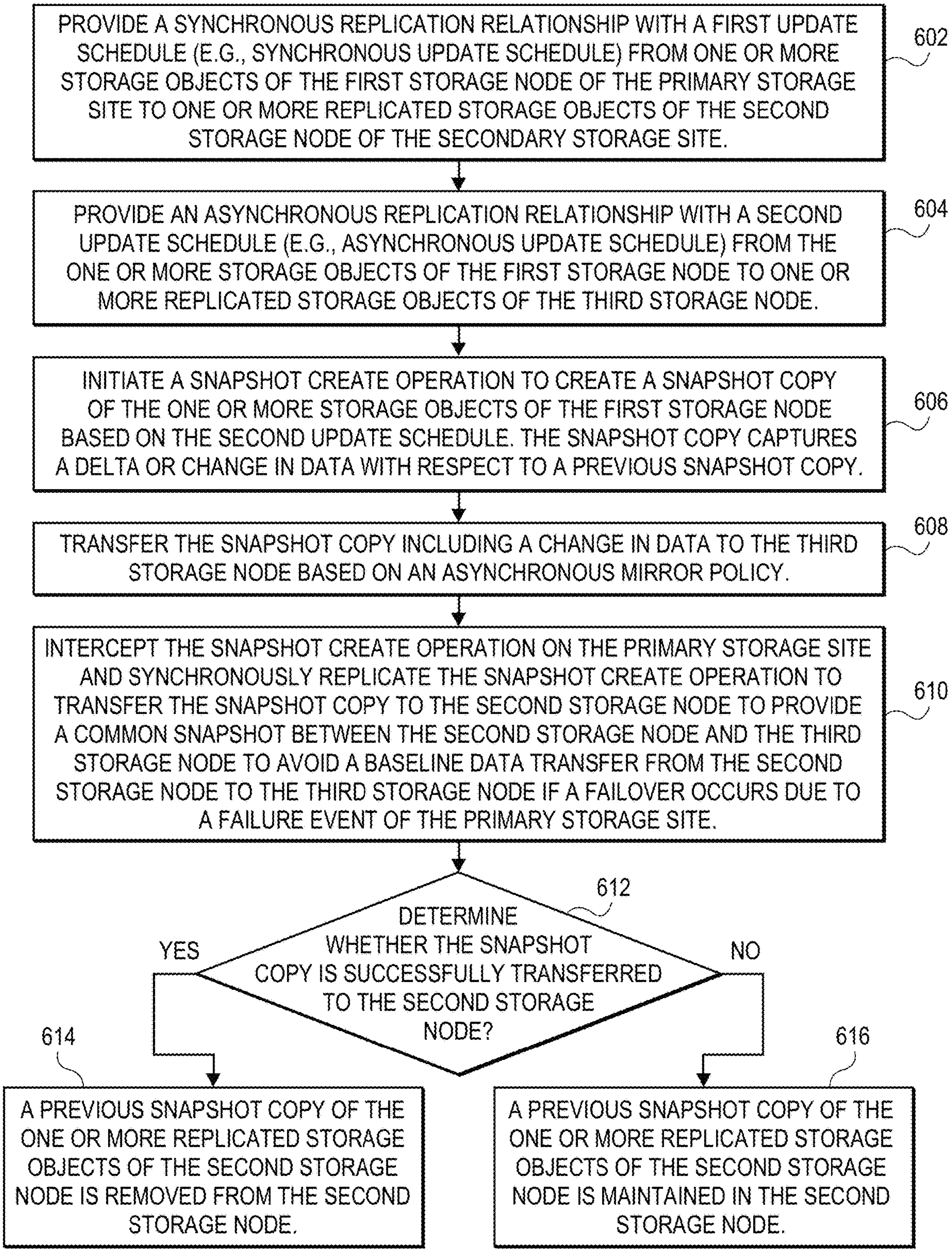
FIGS. 6A and 6B illustrate a computer-implemented method 600 for providing RPO protection and common snapshot retention for a multi-site distributed storage system with a primary storage site (first storage site) having a first storage node, a secondary storage site (second storage site) having a second storage node, and a tertiary storage site (third storage site) having a third storage node in accordance with an embodiment of the present disclosure.
Figure 6B:
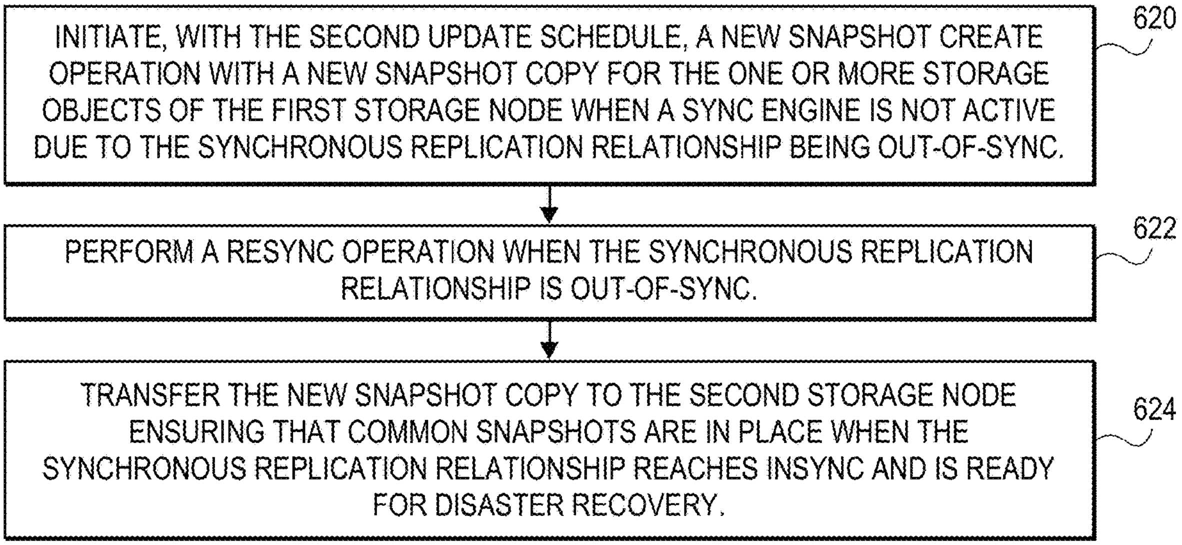

FIGS. 6A and 6B illustrate a computer-implemented method 600 for providing RPO protection and common snapshot retention for a multi-site distributed storage system with a primary storage site (first storage site) having a first storage node, a secondary storage site (second storage site) having a second storage node, and a tertiary storage site (third storage site) having a third storage node in accordance with an embodiment of the present disclosure. Although the operations in the computer-implemented method are shown in a particular order, the order of the actions can be modified. Thus, the illustrated embodiments can be performed in a different order, and some operations may be performed in parallel. Some of the operations listed in FIGS. 6A and 6B are optional in accordance with certain embodiments. The numbering of the operations presented is for the sake of clarity and is not intended to prescribe an order of operations in which the various operations must occur. Additionally, operations from the various flows may be utilized in a variety of combinations. Operations can be performed by storage controllers, storage nodes, or virtual storage machines.

In one embodiment, a multi-site distributed storage system includes the primary storage site having a first storage cluster with one or more storage nodes having numerous replicated datasets (e.g., 40, 80, 400 replication relations) that are replicated from the first storage cluster to a second storage cluster of a secondary storage site. For HA storage node pair, a first storage node and a second peered storage node can each have up to 200 volumes. The replicated datasets can also be replicated from the first storage cluster to a third storage cluster of the third storage site.

In one example, a first synchronous replication relationship may exist between one or more storage objects hosted by a first storage node of a first storage cluster of the primary storage site and one or more replicated storage objects hosted by a second storage node of a second storage cluster of the secondary storage site. The storage object can be a file, a LUN, a LUN stored across multiple volumes, a volume, a container, a subdirectory, or any other object that may be synchronously replicated between the storage clusters, such that modifications to the first storage object are replicated to the replicated storage object before acknowledgements are provided back to clients requesting such modifications. A second synchronous replication relationship may exist between one or more replicated storage objects hosted by the first storage node and one or more replicated storage objects hosted by the second storage node. One or more consistency groups of the first cluster can be assigned a leader role and one or more consistency groups of the second cluster can be assigned a follower role.

A first asynchronous replication relationship (or alternatively mirror vault policy) may exist between the one or more storage objects hosted by the first storage node of the first storage cluster and one or more replicated storage objects hosted by a third storage node of a third storage cluster of the third storage site.

At operation 602, the computer-implemented method provides a synchronous replication relationship with a first update schedule (e.g., synchronous update schedule) from one or more storage objects of the first storage node of the primary storage site to one or more replicated storage objects of the second storage node of the secondary storage site. Establishing the synchronous replication relationship may include a baseline transfer from one or more storage objects of the first storage node of the primary storage site to one or more replicated storage objects of the second storage node of the secondary storage site. The baseline transfer typically involves creating a snapshot copy of the source storage object(s), transferring the snapshot copy and all the data blocks it references to the destination storage object(s), and transfer the remaining, less recent Snapshot copies on the source storage object(s) to the destination storage object(s) for use in case the "active" mirror is corrupted.

At operation 604, the computer-implemented method provides an asynchronous replication relationship with a second update schedule (e.g., asynchronous update schedule) from the one or more storage objects of the first storage node to one or more replicated storage objects of the third storage node. The second update schedule can be the same, less frequent, or more frequent than the first update schedule. Establishing the asynchronous replication relationship may include a baseline transfer from one or more storage objects of the first storage node of the primary storage site to one or more replicated storage objects of the third storage node of the tertiary storage site.

At operation 606, the computer-implemented method initiates a snapshot create operation to create a snapshot copy of the one or more storage objects of the first storage node based on the second update schedule. The snapshot copy captures a delta or change in data with respect to a previous snapshot copy or baseline transfer.

At operation 608, the computer-implemented method transfers the snapshot copy including a change in data to the third storage node based on an asynchronous mirror policy. At operation 610, the computer-implemented method intercepts the snapshot create operation on the primary storage site and synchronously replicates the snapshot create operation to transfer the snapshot copy to the second storage node to provide a common snapshot between the second storage node and the third storage node to avoid a baseline data transfer from the second storage node to the third storage node if a failover (e.g., an automatic unplanned failover (AUFO), a planned failover) occurs from the primary storage site to the secondary storage site. The AUFO may occur due to a failure event of the primary storage site.

At operation 612, the computer-implemented method determines whether the snapshot copy is successfully transferred to the second storage node. If so, then a previous snapshot copy of the one or more replicated storage objects of the second storage node is removed from the second storage node at operation 614. If not, then a previous snapshot copy of the one or more replicated storage objects of the second storage node is maintained in the second storage node at operation 616 when the snapshot copy is not successfully transferred to the second storage node.

At operation 620 of FIG. 6B, the computer-implemented method initiates, with the second update schedule, a new snapshot create operation with a new snapshot copy for the one or more storage objects of the first storage node when a sync engine is not active due to the synchronous replication relationship being Out-of-Sync.

At operation 622, the computer-implemented method performs a resync operation when the synchronous replication relationship is Out-of-Sync. At operation 624, the computer-implemented method transfers the new snapshot copy to the second storage node ensuring that common snapshots are in place when the synchronous replication relationship reaches Insync and is ready for disaster recovery. In one example, the second update schedule has a same schedule as the first update schedule of the synchronous replication relationship.

Figure 7A:
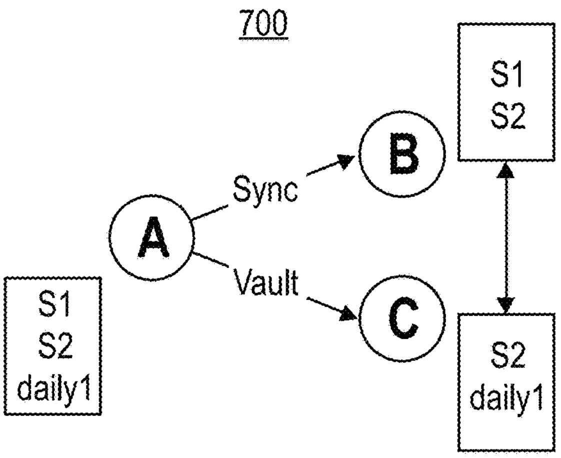
FIG. 7A illustrates an initial state of the multi-site distributed storage system 700.
Figure 7B:
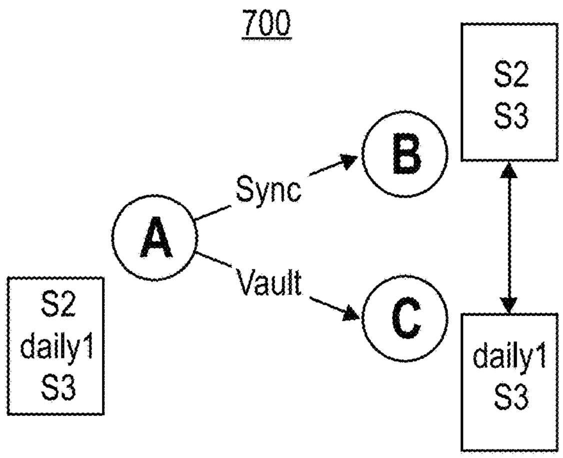
FIG. 7B illustrates a subsequent state of the multi-site distributed storage system 700 due to a Sync relationship's schedule (e.g., update snapshot once per hour).
Figure 7C:
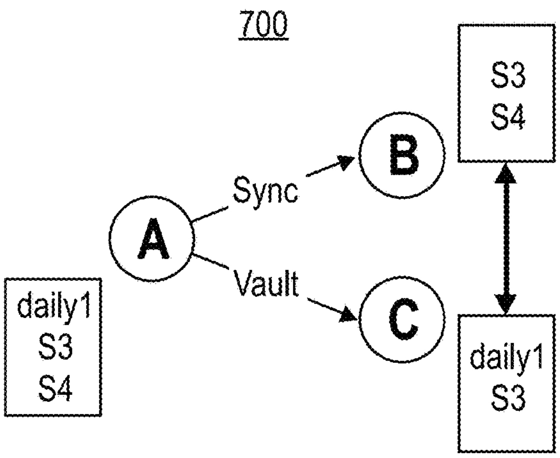
FIG. 7C illustrates a subsequent state of the multi-site distributed storage system 700 due to a Sync relationship's schedule (e.g., update snapshot once per hour).

FIGS. 7A-7C illustrate common snapshot retention with frequent snapshot updates for synchronous and asynchronous legs of a multi-site distributed storage system in accordance with one embodiment. The multi-site distributed storage system 700 includes a 3-site disaster recovery (DR) for an enterprise application using Sync-Async fan-out topology with a Vault based policy (e.g., Vault or MirrorAndVault) on the async leg A to C. Upon a disaster at the primary storage site A taking a primary copy of a dataset offline, the expectation is for the tertiary storage site C (Vault destination) to continue to work from a secondary storage site B (Sync destination), post-failover to the Sync destination.

In order for the Vault Destination to continue to function with the secondary site B (e.g., Sync destination) as a new data source, a common snapshot needs to be available between the two copies and therefore, in steady state of a 3-site fan-out topology the tertiary storage site C (e.g., Async destination) and secondary site B (e.g., Sync destination) do need to maintain a common snapshot.

The following are considerations for common snapshot between the DR sites. The sync leg A to B from the primary storage site A to the secondary storage site B may not replicate the scheduled snapshots created on the one or more storage objects of the primary storage site A.

A default policy for Vault may only replicate snapshots created with "daily" and "weekly" frequency. A default Mirror and Vault policy creates a new mirror create snap on each update and has a rule for mirror create to replicate this snapshot. Hence using the default policies may result in no common snapshots between the secondary B and tertiary sites C at any point.

Thus, a rule is added to the Vault policy to mirror snapshots created by the sync leg A to B. Then, a create and initialization of an asynchronous mirroring relationship with Vault policy occurs between the one or more storage objects of a first node of the primary storage site and the one or more replicated storage objects of the third node of the tertiary site with an asynchronous schedule that matches the Sync relationship's schedule for the synchronous relationship between the one or more storage objects of the primary storage site and the one or more replicated storage objects of the secondary storage site.

FIG. 7A illustrates an initial state of the multi-site distributed storage system 700. The site A initially has a snapshot S1 and subsequent snapshot S2 due to the Sync relationship's schedule and a snapshot daily 1 due to the asynchronous schedule for the async leg A to C. The site B initially has a snapshot S1 and subsequent snapshot S2 due to the Sync relationship's schedule. The site C initially has a snapshot S2 due to the Sync relationship's schedule and a snapshot daily 1 due to the asynchronous schedule for the async leg A to C. Sites B and C share a common snapshot S2.

FIG. 7B illustrates a subsequent state of the multi-site distributed storage system 700 due to a Sync relationship's schedule (e.g., update snapshot once per hour). The site A subsequently has a snapshot S2, snapshot daily 1, and subsequent snapshot S3 because snapshot S1 has been removed or rotated out of site A. The site B subsequently has a snapshot S2 and S3 because snapshot S1 has been removed or rotated out of site B. The site C subsequently has a snapshot S3 due to the Sync relationship's schedule and a snapshot daily 1 due to the asynchronous schedule for the async leg A to C because snapshot S2 has been removed or rotated out of site C. Sites B and C share a common snapshot S3.

FIG. 7C illustrates a subsequent state of the multi-site distributed storage system 700 due to a Sync relationship's schedule (e.g., update snapshot once per hour). The site A subsequently has a snapshot daily 1, and subsequent snapshots S3 and S4 because snapshot S2 has been removed or rotated out of site A. The site B subsequently has a snapshot S3 and S4 because snapshot S2 has been removed or rotated out of site B. The site C subsequently has a snapshot S3 and a snapshot daily 1 due to the asynchronous schedule for the async leg A to C triggering before an update snapshot of the Sync relationship's schedule. Sites B and C share a common snapshot S3 but site C does not have snapshot S4.

If the vault relationship is the only async leg in the 3-site topology as illustrated in FIGS. 7A-7C, then the new mirroring rule will pick up and mirror the sync leg's snapshot to the vault destination of site C. However, if multiple async legs are fanned-out from the primary site A, then the new mirroring rule could potentially pick up snapshots created by the async mirror leg which can lead to no common snapshots between the sync site and vault destinations.

A new enhancement of the storage OS overcomes the above caveat with async fan-out by implementing snapshot symmetry as illustrated in FIGS. 8A-8D. With this enhancement, the new snapshot created on the primary site A upon an async leg schedule will be intercepted and replicated to the mirror copy at the sync site B. The following FIGS. 8A-8D illustrate how this ensures the 2 mirror copies at site B and site C maintain a common snapshot at all times. This is illustrated with the async leg having a mirror all snapshots policy.

Figure 8A:
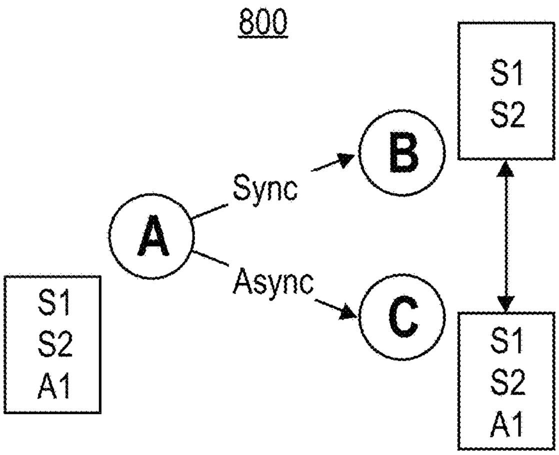
FIG. 8A illustrates an initial state of the multi-site distributed storage system 800 having snapshot symmetry in accordance with one embodiment.

FIG. 8A illustrates an initial state of the multi-site distributed storage system 800 having snapshot symmetry in accordance with one embodiment. The site A initially has a snapshot S1 and subsequent snapshot S2 due to the Sync relationship's schedule and a snapshot A1 due to the asynchronous schedule for the async leg A to C. The site B initially has a snapshot S1 and subsequent snapshot S2 due to the Sync relationship's schedule. The site C initially has a snapshot S1 and snapshot S2 due to the Sync relationship's schedule and a snapshot A1 due to the asynchronous schedule for the async leg A to C. Sites B and C share a common snapshot S2.

Figure 8B:
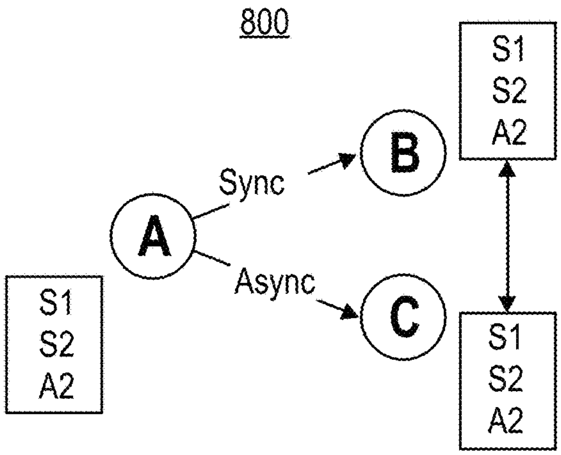
FIG. 8B illustrates a subsequent state of the multi-site distributed storage system 800 due to an async relationship's schedule (e.g., update snapshot once per a time period) triggering a snapshot A2 on site A, which is then replicated to sites B and C.

FIG. 8B illustrates a subsequent state of the multi-site distributed storage system 800 due to an async relationship's schedule (e.g., update snapshot once per a time period) triggering a snapshot A2 on site A, which is then replicated to sites B and C. The site A has a snapshot S1 and S2, and snapshot A2 from async relationship's schedule. The site B has a snapshot S1, S2, and A2. The site C has a snapshots S1, S2, and A2.

Figure 8C:
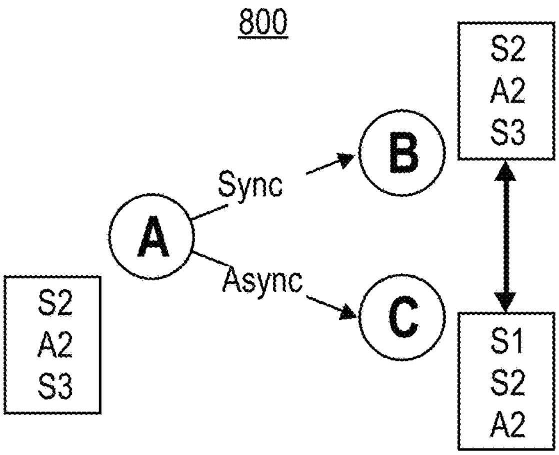
FIG. 8C illustrates a subsequent state of the multi-site distributed storage system 800 due to a sync relationship's schedule (e.g., update snapshot once per a time period) triggering a snapshot S3 on site A, which is then replicated to site B.

FIG. 8C illustrates a subsequent state of the multi-site distributed storage system 800 due to a sync relationship's schedule (e.g., update snapshot once per a time period) triggering a snapshot S3 on site A, which is then replicated to site B. The sites A and B each have a snapshot S2 and S3, and snapshot A2 from async relationship's schedule. The site C has snapshots S1, S2, and A2.

Figure 8D:
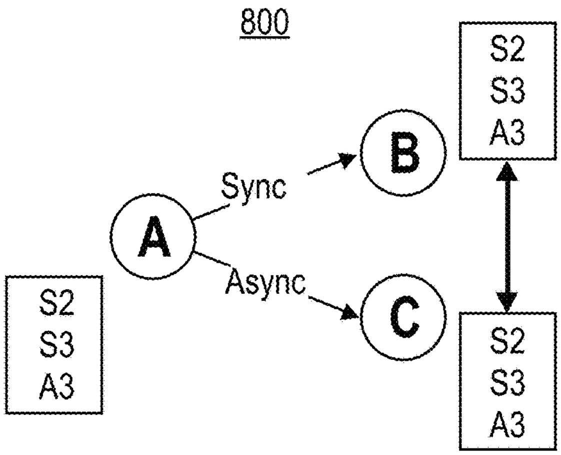
FIG. 8D illustrates a subsequent state of the multi-site distributed storage system 800 due to an async relationship's schedule (e.g., update snapshot once per a time period) triggering a snapshot A3 on site A, which is then replicated to sites B and C. The sites A, B, and C each have a snapshot S2 and S3, and snapshot A3 from async relationship's schedule.

FIG. 8D illustrates a subsequent state of the multi-site distributed storage system 800 due to an async relationship's schedule (e.g., update snapshot once per a time period) triggering a snapshot A3 on site A, which is then replicated to sites B and C. The sites A, B, and C each have a snapshot S2 and S3, and snapshot A3 from async relationship's schedule.

Figure 9:
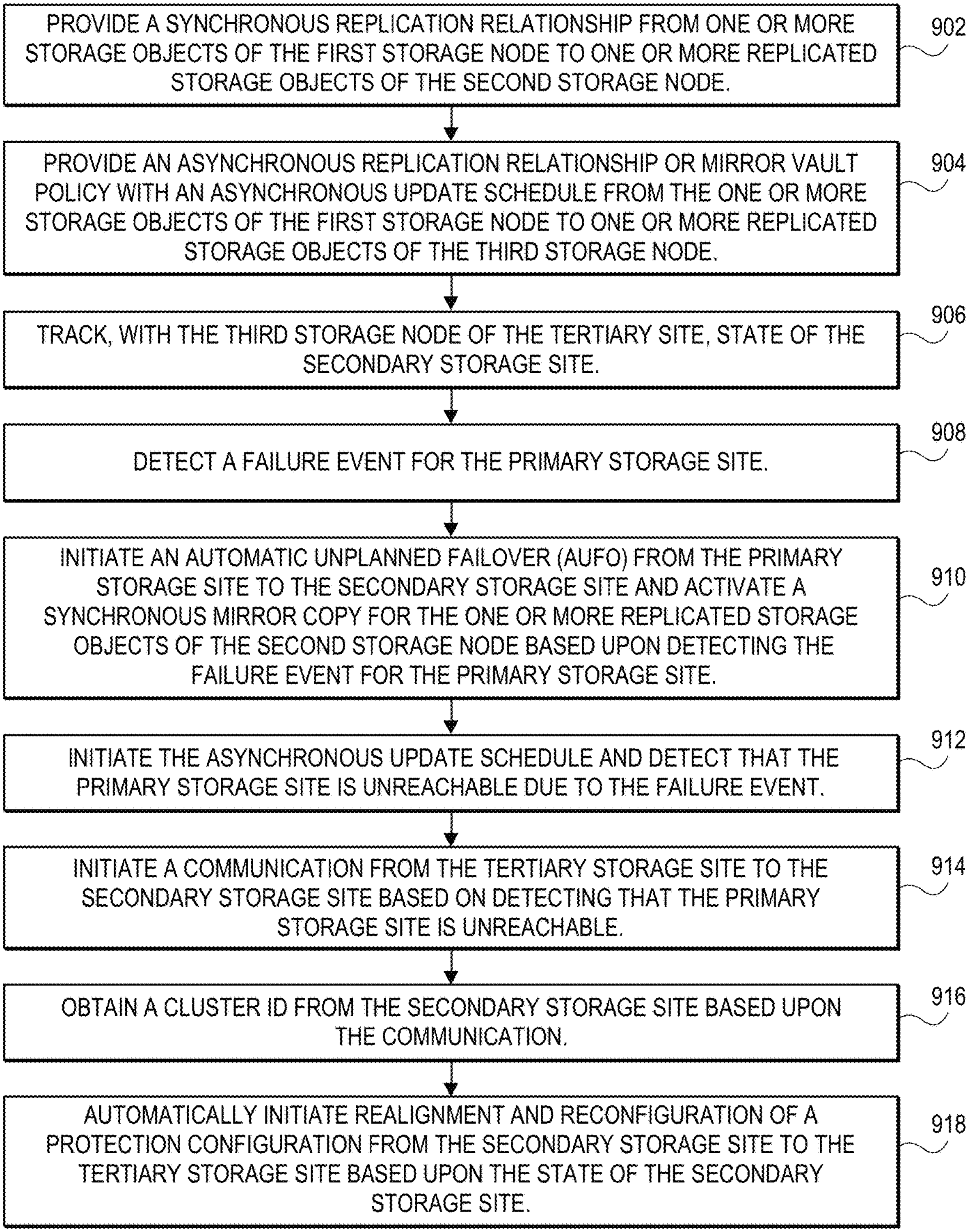
FIG. 9 illustrates a computer-implemented method 900 for providing automatic fanout reconfiguration for one or more asynchronous legs after a failure event that causes a failover from a primary storage site to a secondary storage site for a multi-site distributed storage system.

FIG. 9 illustrate a computer-implemented method 900 for providing automatic fanout reconfiguration for one or more asynchronous legs after a failure event that causes a failover from a primary storage site to a secondary storage site for a multi-site distributed storage system. A primary storage site (first storage site) includes a first storage node, a secondary storage site (second storage site) includes a second storage node, and a tertiary storage site (third storage site) includes a third storage node in accordance with an embodiment of the present disclosure. Although the operations in the computer-implemented method are shown in a particular order, the order of the actions can be modified. Thus, the illustrated embodiments can be performed in a different order, and some operations may be performed in parallel. Some of the operations listed in FIG. 9 are optional in accordance with certain embodiments. The numbering of the operations presented is for the sake of clarity and is not intended to prescribe an order of operations in which the various operations must occur. Additionally, operations from the various flows may be utilized in a variety of combinations. Operations can be performed by storage controllers, storage nodes, or virtual storage machines.

In one embodiment, a multi-site distributed storage system includes the primary storage site having a first storage cluster with one or more storage nodes having numerous replicated datasets (e.g., 40, 80, 400 replication relations) that are replicated from the first storage cluster to a second storage cluster of a secondary storage site. For HA storage node pair, a first storage node and a second peered storage node can each have up to 200 volumes. The replicated datasets can also be replicated from the first storage cluster to a third storage cluster of the third storage site.

In one example, a first synchronous replication relationship may exist between one or more storage objects hosted by a first storage node of a first storage cluster of the primary storage site and one or more replicated storage objects hosted by a second storage node of a second storage cluster of the secondary storage site. The storage object can be a file, a LUN, a LUN stored across multiple volumes, a volume, a container, a subdirectory, or any other object that may be synchronously replicated between the storage clusters, such that modifications to the first storage object are replicated to the replicated storage object before acknowledgements are provided back to clients requesting such modifications. A second synchronous replication relationship may exist between one or more replicated storage objects hosted by the first storage node and one or more replicated storage objects hosted by the second storage node. One or more consistency groups of the first cluster can be assigned a leader role and one or more consistency groups of the second cluster can be assigned a follower role.

An asynchronous replication relationship (or alternatively mirror vault policy) may exist between the one or more storage objects hosted by the first storage node of the first storage cluster and one or more replicated storage objects hosted by a third storage node of a third storage cluster of the third storage site.

At operation 902, the computer-implemented method provides a synchronous replication relationship from one or more storage objects of the first storage node to one or more replicated storage objects of the second storage node. At operation 904, the computer-implemented method provides an asynchronous replication relationship or mirror vault policy with an asynchronous update schedule from the one or more storage objects of the first storage node to one or more replicated storage objects of the third storage node for an initial protection configuration. At operation 906, the computer-implemented method tracks, with the third storage node of the tertiary site, a state of the secondary storage site. At operation 908, the computer-implemented method detects a failure event for the primary storage site.

At operation 910, the computer-implemented method initiates a failover (e.g., an automatic unplanned failover (AUFO)) from the primary storage site to the secondary storage site and activates a synchronous mirror copy for the one or more replicated storage objects of the second storage node based upon detecting the failure event for the primary storage site. At operation 912, the computer-implemented method initiates the asynchronous update schedule and detects that the primary storage site is unreachable due to the failure event. At operation 914, the computer-implemented method initiates a communication from the tertiary storage site to the secondary storage site based on detecting that the primary storage site is unreachable.

At operation 916, the computer-implemented method obtains a cluster ID from the secondary storage site based upon the communication.

At operation 918, the computer-implemented method automatically initiates realignment and reconfiguration of the protection configuration to form from the secondary storage site to the tertiary storage site (instead of the initial configuration from the primary storage site to the tertiary storage site) based upon the state of the secondary storage site. In one example, the realignment and protection configuration comprises an asynchronous replication relationship (or mirror vault policy) from the secondary storage site to the tertiary storage site.

The asynchronous update schedule can be the same, less frequent, or more frequent than the synchronous update schedule. Establishing the asynchronous replication relationship may include a baseline transfer from one or more storage objects of the first storage node of the primary storage site to one or more replicated storage objects of the third storage node of the tertiary storage site.

Figure 10A:
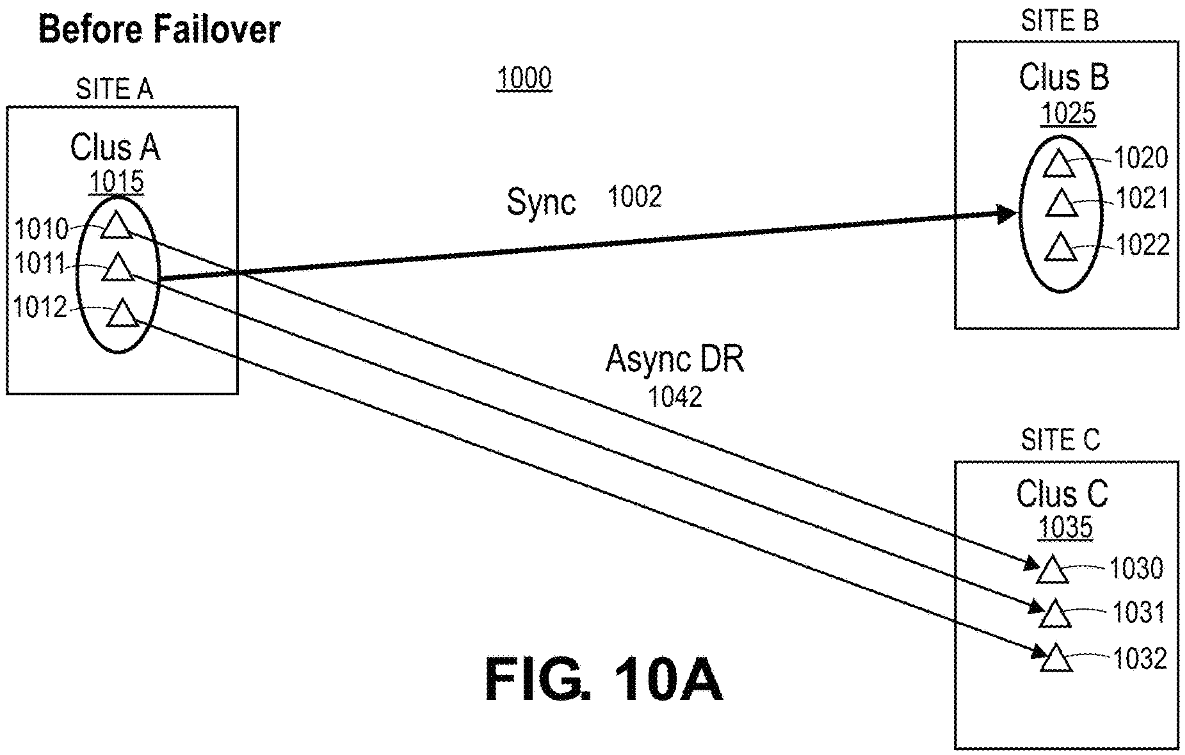
FIG. 10A illustrates a fanout configuration for an asynchronous leg before a failure event that causes a failover from a primary storage site A to a secondary storage site B for a multi-site distributed storage system.

FIG. 10A illustrates a fanout configuration of a distributed storage system 1000 for an asynchronous leg before a failure event that causes a failover from a primary storage site A to a secondary storage site B for a multi-site distributed storage system. A primary storage site A includes a cluster A with one or more storage nodes. A storage node 1015 includes storage objects 1010-1012. A secondary storage site B includes a cluster B with one or more storage nodes. A storage node 1025 includes storage objects 1020-1022. A tertiary storage site C includes a cluster C with one or more storage nodes. A storage node 1035 includes storage objects 1030-1032.

Initially, a synchronous relationship exists from storage site A to storage site B while an asynchronous relationship exists from the storage site A to storage site C. A failover as controlled by a storage OS occurs due to a failure event reversing a direction of relationship from initially being storage site A to storage site B to being storage site B to storage site A. However, if there is a fanout async leg from storage site A to storage site C for the initial configuration, then the async leg should be converted from storage site B to storage site C after the failover due to the AC being nonfunctional during a failure event of storage site A.

Initial Scenario: AB (AutomatedFailover), AC (Async leg)

Final Scenario after failover: BA (AutomatedFailover), BC (Async leg)

Figure 10B:
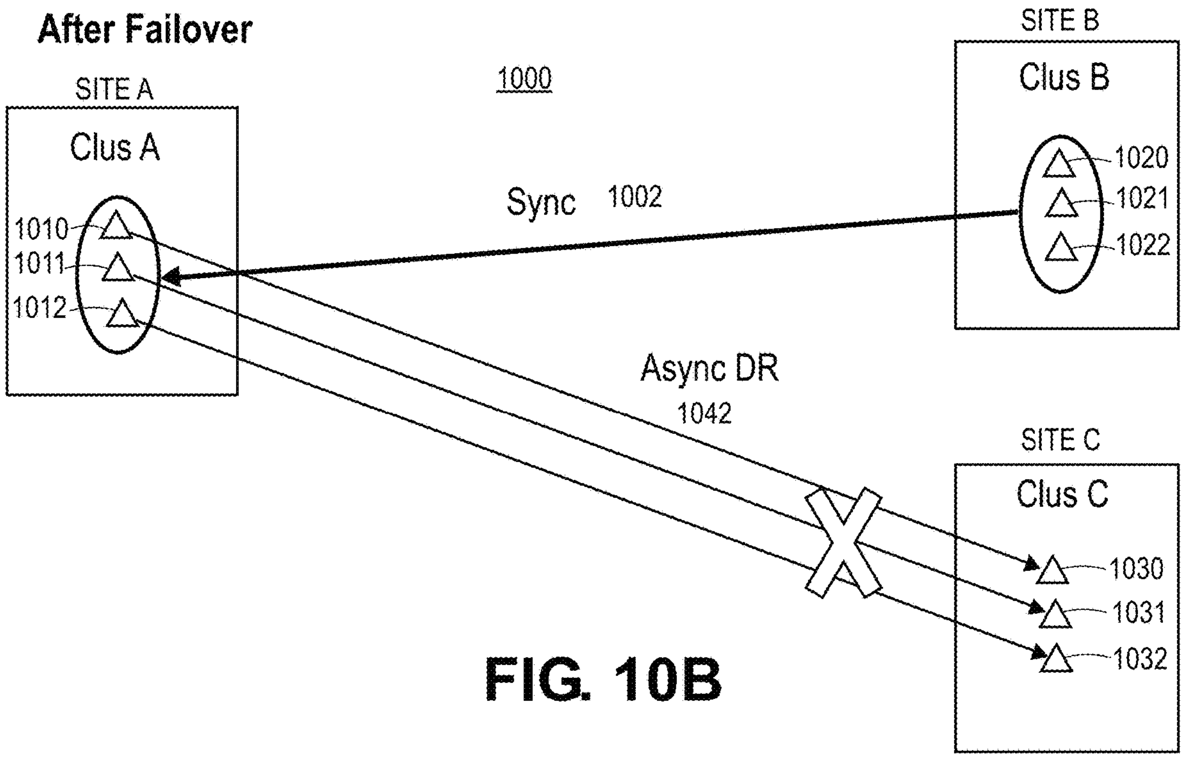
FIG. 10B illustrates a fanout configuration for an asynchronous leg after a failure event that causes a failover from a primary storage site A to a secondary storage site B for a multi-site distributed storage system.

FIGS. 10A and 10B illustrate that after a failover due to a failure event, a storage OS (e.g., storage OS 410) provides a synchronous replication relationship between site A and site B and provides automatic flip resync to re-establish zero RPO and zero RTO protection after the failover. However, there can be a disruption in a 3 site DR architecture after failover for a previous solution. The synchronous leg 1002 is resumed automatically, while the far-site protection which is an Async leg 1042 becomes non-functional as illustrated in FIG. 10B for the previous solution due to no support for cascade relations. A user would need to intervene manually by deleting the relationship AC and further create a relationship from site B to site C.

Figure 11:
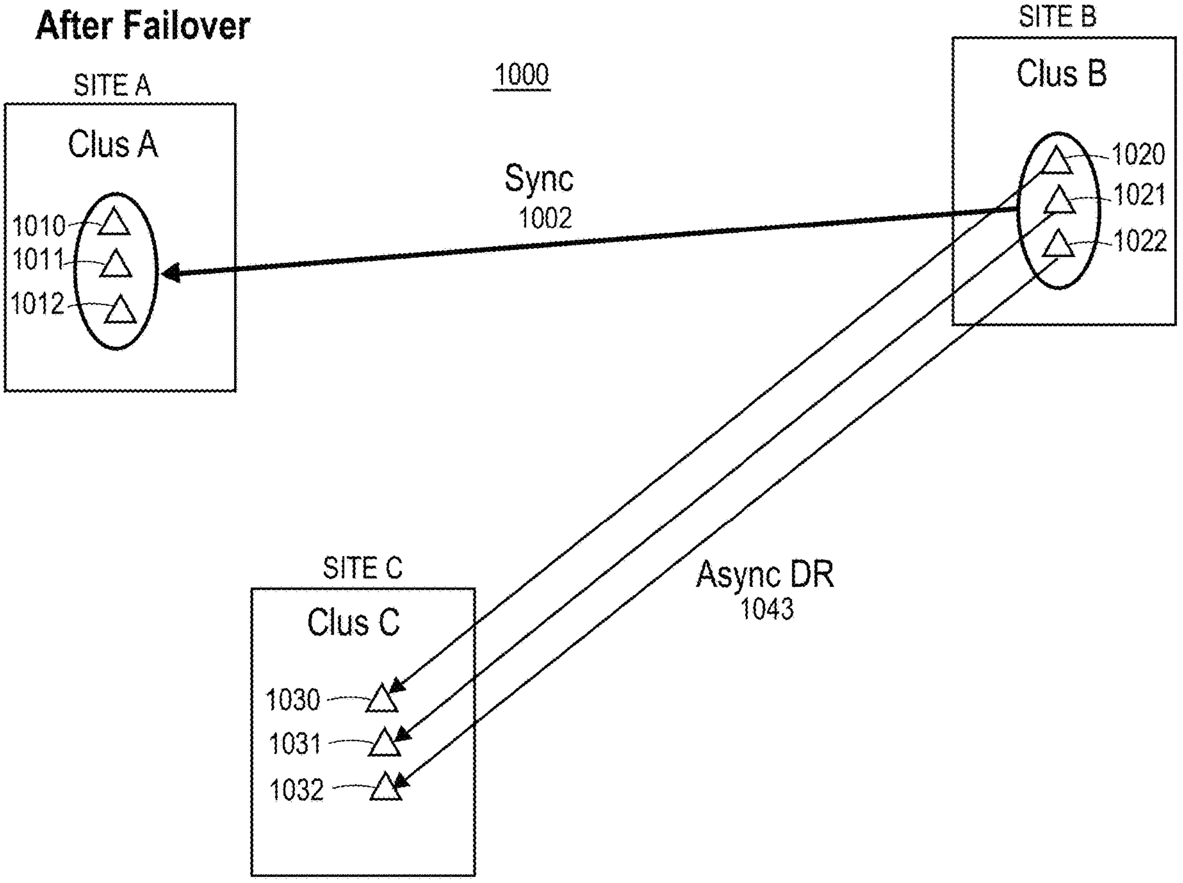
FIG. 11 illustrates the automatic realigning and reconfiguration of protection configuration to storage site C after a failure event of the primary site A in accordance with one embodiment.

The present disclosure provides a new solution for the storage OS that will automatically reconfigure the asynch leg post failover with no user intervention needed. FIG. 11 illustrates the automatic realigning and reconfiguration of protection configuration to storage site C with an Async leg 1043 after a failure event of the primary site A in accordance with one embodiment.

Upon initial configuration of the sites A, B, and C, a peering relationship is established between cluster B and C. During a planned failover, the storage OS determines whether any fan-out relationships exist while flipping the configuration from site A being a leader and site B being a follower to site A being a follower and site B being the leader. While reversing the synchronous AB leg to be a synchronous BA leg, cluster B retrieves the fan out configuration details from Cluster A. Cluster B initiates a call to modify the destination configuration at Cluster C to new source endpoints on Cluster B (instead of initial source endpoints on Cluster A).

For a design sequence flow for a planned failover, on site A, the flow invalidates source cache AB on all nodes, deletes A to B replicated database and creates B to A replicated database, clears source cache AB on all nodes, and seeds destination cache B to A on all nodes. For site C, the flow receives a call from site B, for each (source versus uuid, source volume name), performs a lookup local destination mirror using query on source versus uuid and volume name, invalidates destination cache, deletes the destination entry and creates a new destination entry with new source fields, clears old destination cache, and seeds destination cache. For site B, the flow invalidates destination cache AB on all nodes, deletes destination replicated database AB and creates source replicated database B to A, clears destination cache AB on all nodes, and seeds source cache BA on all nodes.

A design sequence flow for an automatic unplanned failover (AUFO) follows below. Post AUFO, the async destination Site C can trigger the reconfiguration upon receiving a cluster session manager error in the next scheduled update if site C is not able to communicate with site A. Site C needs to be aware of the sync destination's (Site B) cluster ID prior to a failover. During a failover, site A is not available to fetch the cluster ID of the async destination (Site-C) on demand. If the sync leg is created first, creation of the async source replicated database (RDB) triggers pushing the cluster ID of site B to site C. If the async leg is created first, creation of the sync source RDB triggers pushing the cluster ID of site B to Site C.

Figure 12A:
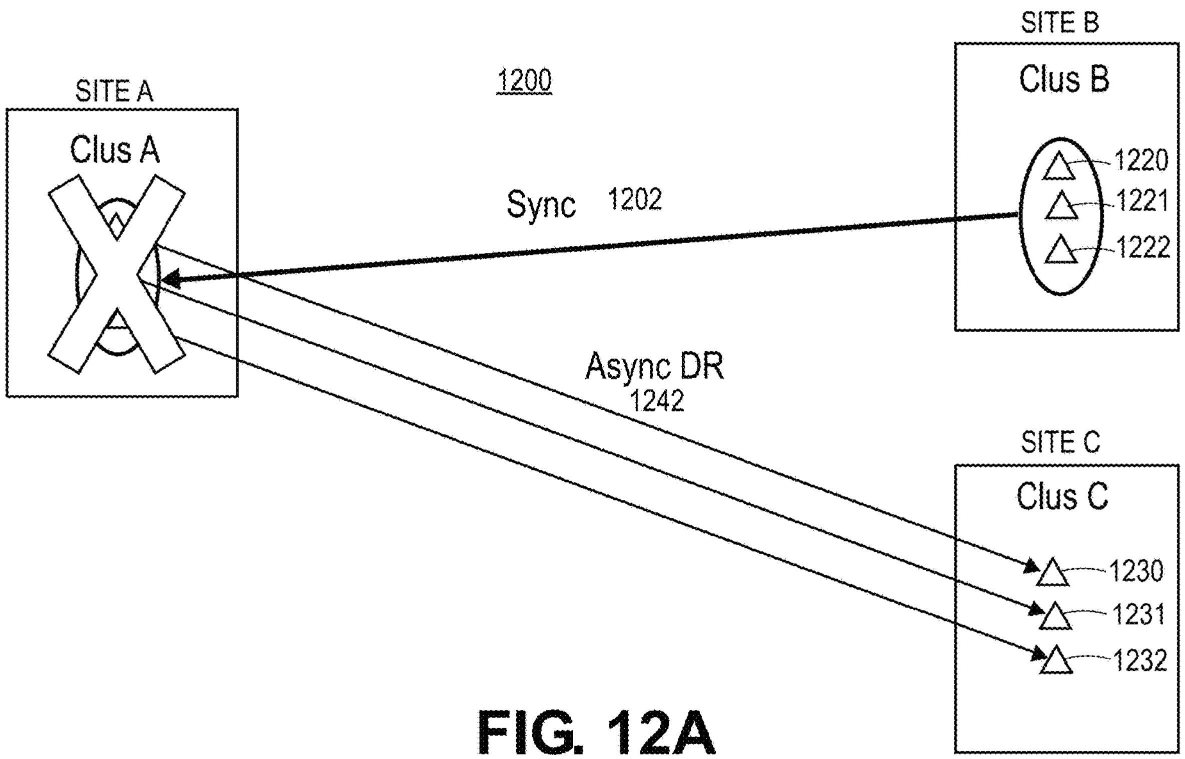
FIG. 12A illustrates a failure event at site A and the failover processing in accordance with one embodiment.

FIG. 12A illustrates a failure event at site A and the failover processing of a multi-site distributed storage system 1200 in accordance with one embodiment. The initial A to B synch leg has reversed to be a B to A synch leg 1202. A primary storage site A includes a cluster A with one or more storage nodes. A secondary storage site B includes a cluster B with one or more storage nodes and storage objects 1220-1222. A tertiary storage site C includes a cluster C with one or more storage nodes and storage objects 1230-1232. An asynch leg 1242 is formed from site A to site C.

Figure 12B:
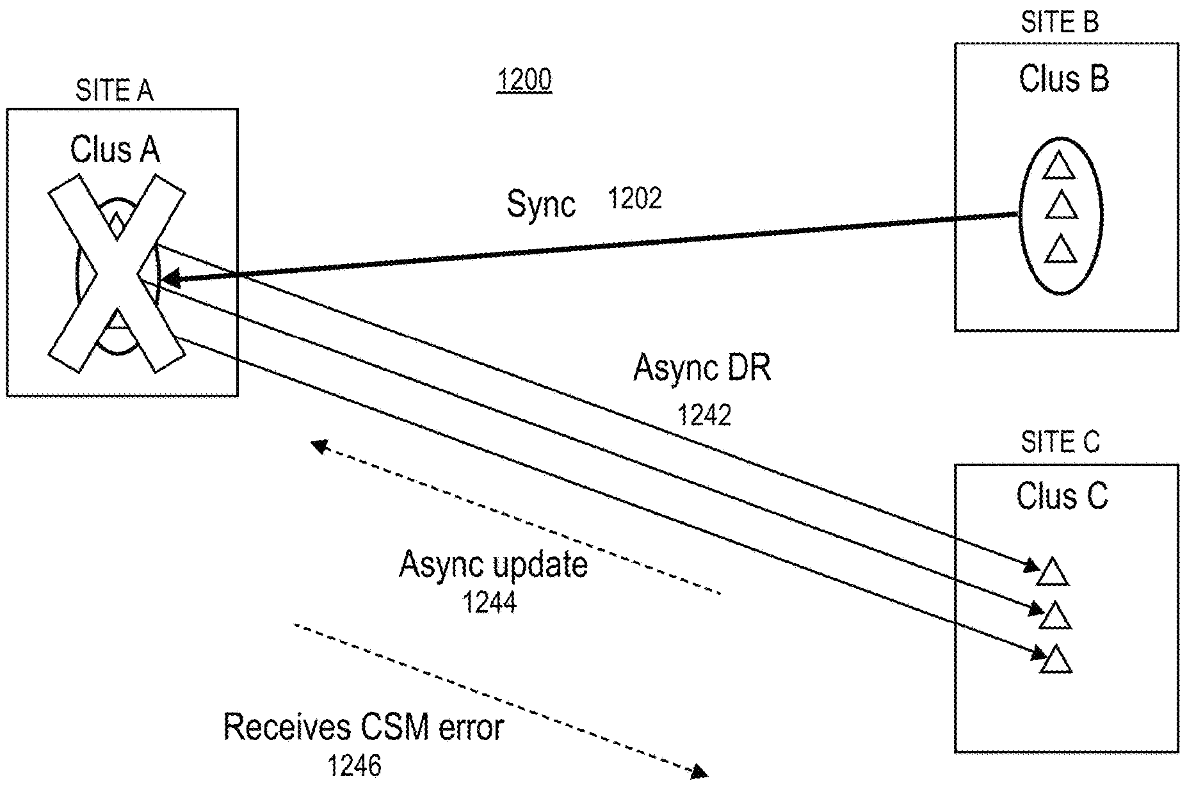
FIG. 12B illustrates an asynch schedule at site C sending an asynch update 1244 to site A and receiving an error message 1246 due to the failure event at site A.

FIG. 12B illustrates an asynch schedule at site C sending an asynch update 1244 to site A and receiving an error message 1246 due to the failure event at site A.

Figure 12C:
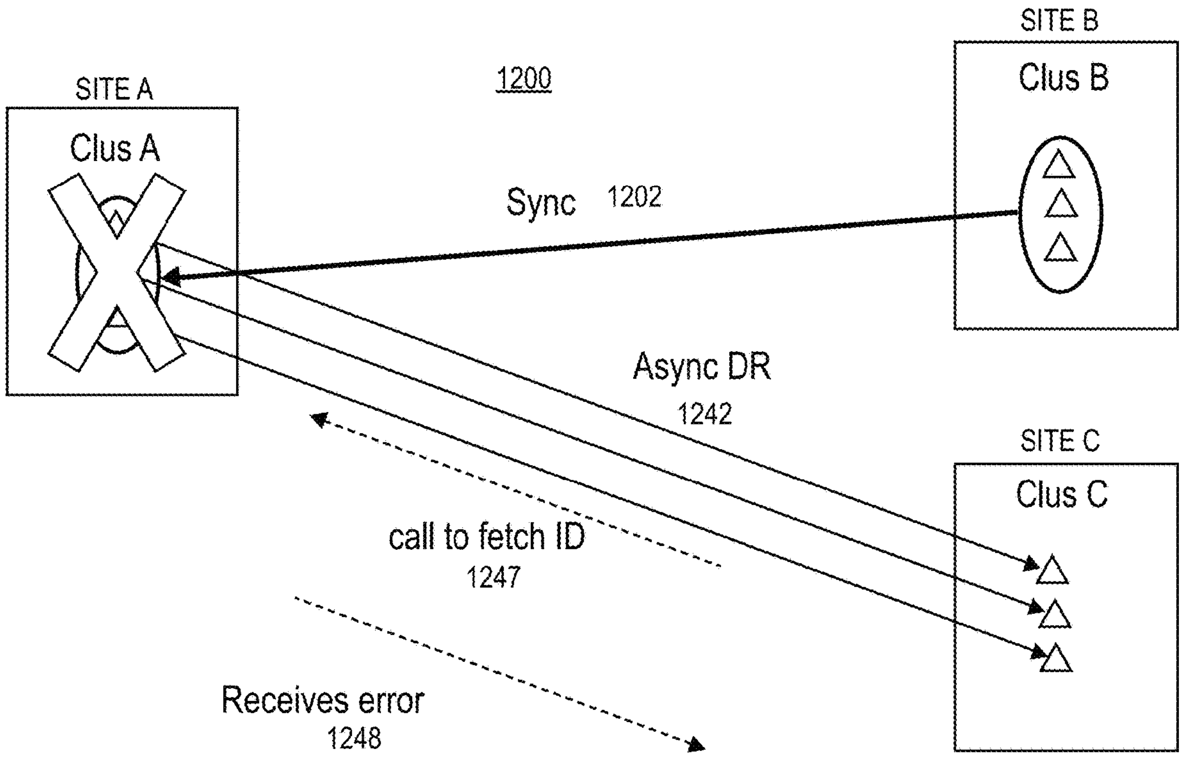
FIG. 12C illustrates site C sending a call 1247 to site A to fetch a cluster ID and receiving an error message 1248 due to the failure event at site A.

FIG. 12C illustrates site C sending a call 1247 to site A to fetch a cluster ID and receiving an error message 1248 due to the failure event at site A.

Figure 12D:
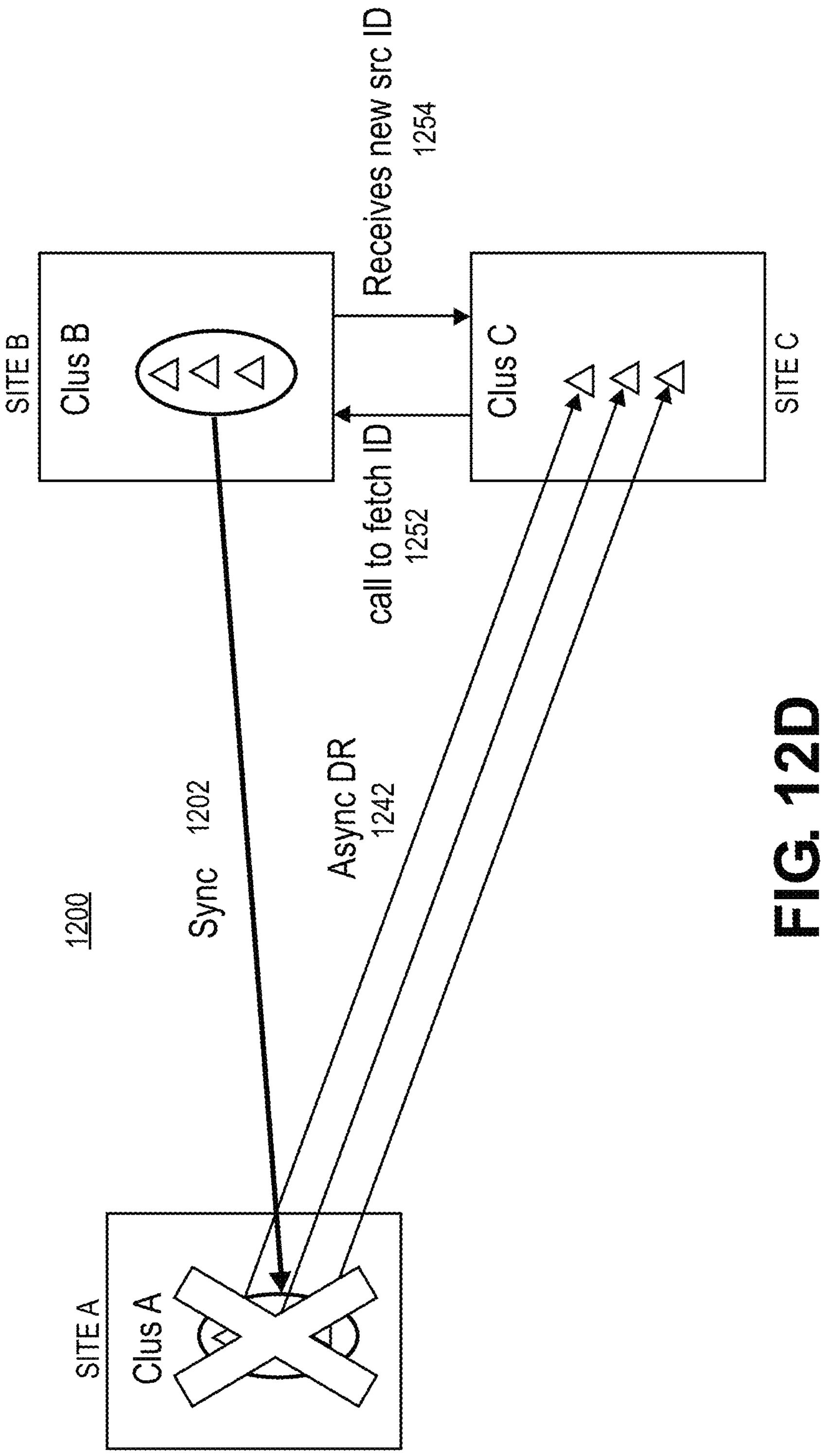
FIG. 12D illustrates site C looking up an alternative cluster ID for the asynchronous relationship and sending a call 1252 to site B to fetch an alternative cluster ID and receiving a cluster ID 1254 from site B.

FIG. 12D illustrates site C looking up an alternative cluster ID for the asynchronous relationship and sending a call 1252 to site B to fetch an alternative cluster ID and receiving a cluster ID 1254 from site B.

Figures 12E, 12F:
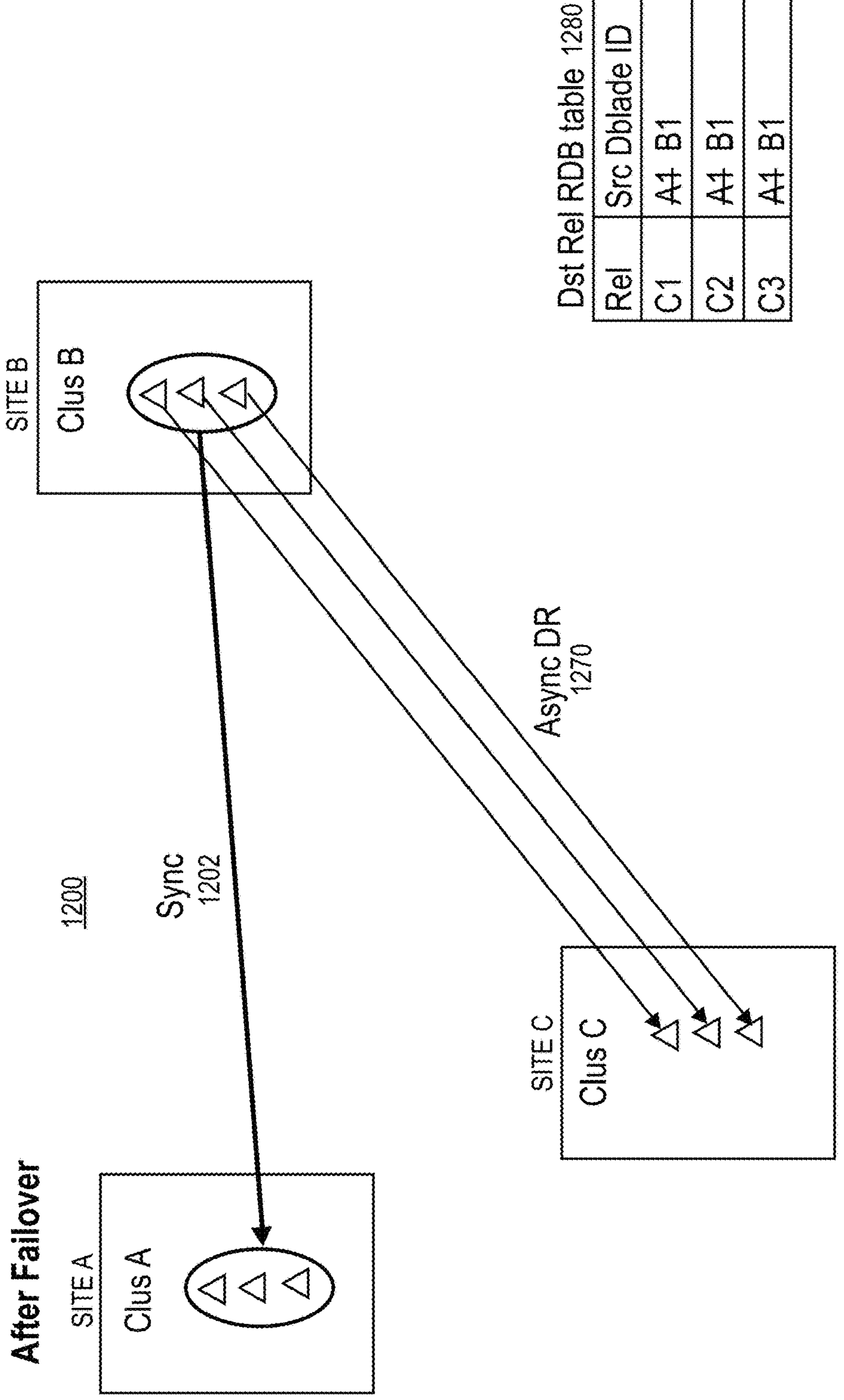

FIG. 12E illustrates establishing of an asynchronous leg 1270 with an asynchronous relationship from site B to site C while FIG. 12F illustrates updating a destination relationship RDB table 1280 with site C now being a destination for site B as a source.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or non-transitory computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 13:
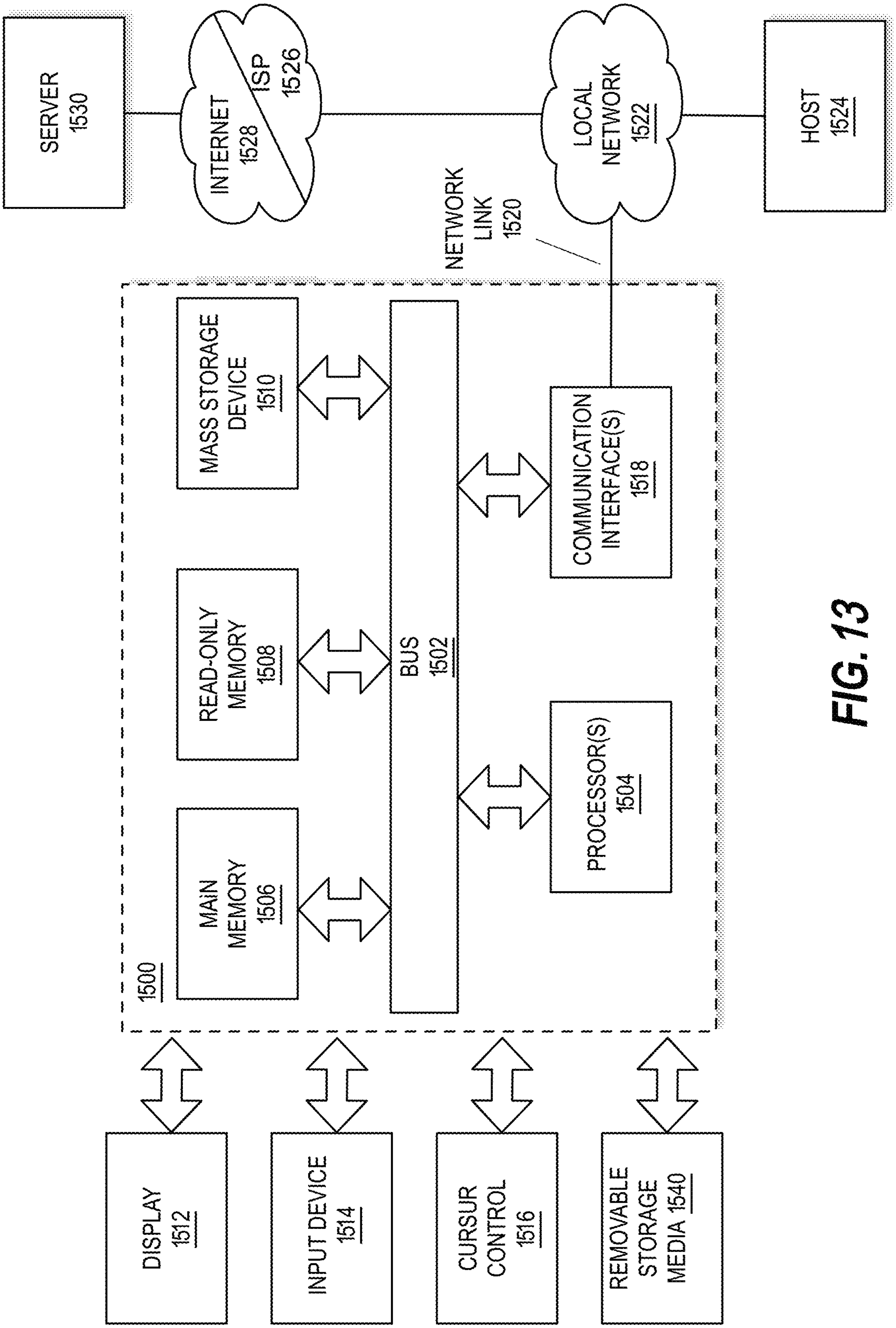
FIG. 13 illustrates an example computer system in which or with which embodiments of the present disclosure may be utilized.

FIG. 13 is a block diagram that illustrates a computer system 1500 in which or with which an embodiment of the present disclosure may be implemented. Computer system 1500 may be representative of all or a portion of the computing resources associated with a storage node (e.g., storage node 136*a-n*, storage node 146*a-n*, storage node 156*a-b*, storage node 236*a-n*, storage node 246*a-n*, nodes 311-312, nodes 321-322, nodes 356*a*-356*b*, storage node 400), a mediator (e.g., mediator 120, mediator 220, mediator 360), or an administrative workstation (e.g., computer system 110, computer system 210). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., processing logic, hardware processor(s) 1504) coupled with bus 1502 for processing information. Hardware processor 504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, a non-transitory computer-readable storage medium, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. The received code may be executed by processor 1504 as it is received, or stored in storage device 1510, or other non-volatile storage for later execution.

Figure 14:
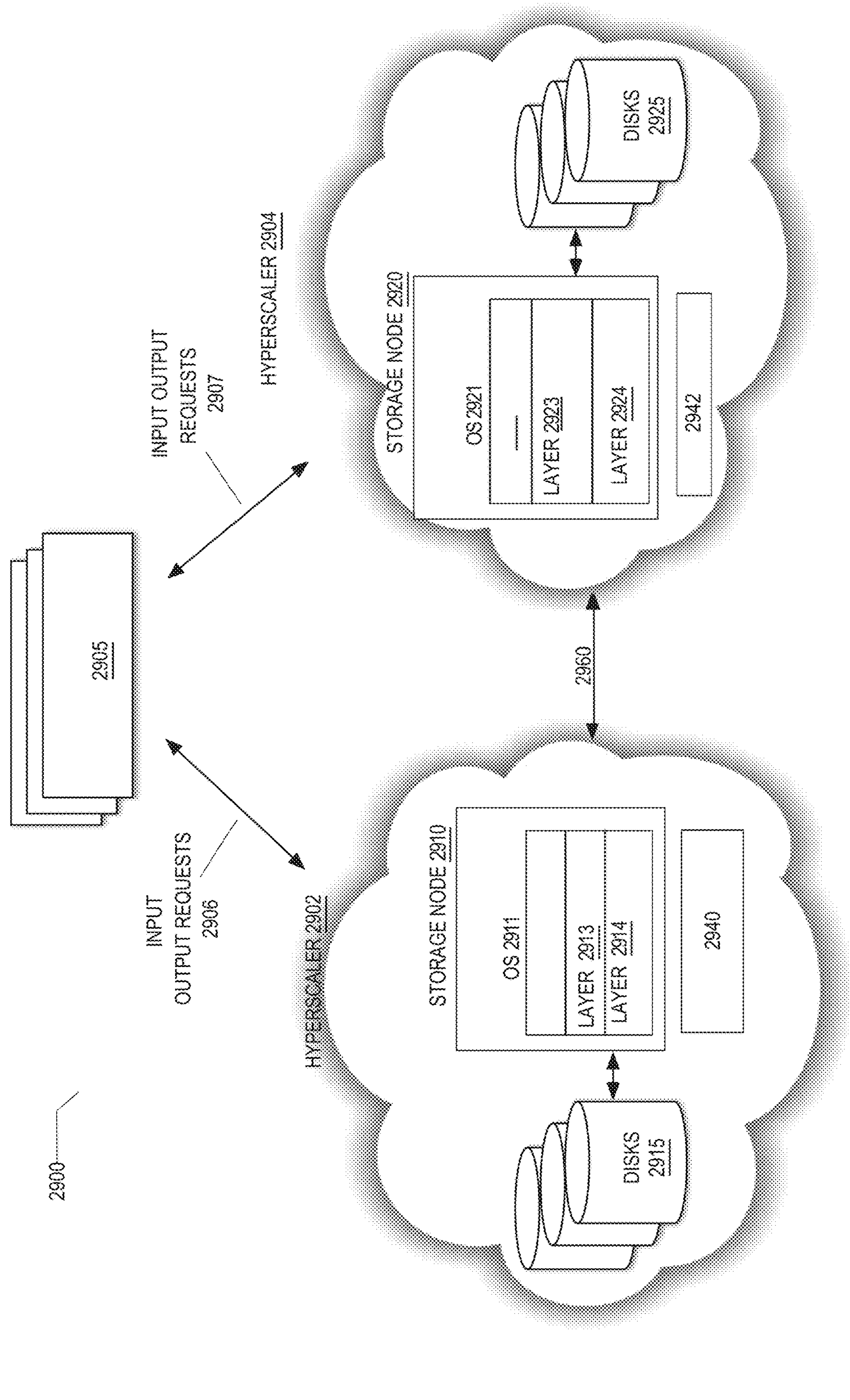
FIG. 14 is a block diagram illustrating a cloud environment in which various embodiments may be implemented.

FIG. 14 is a block diagram illustrating a cloud environment in which various embodiments may be implemented (e.g., virtual storage nodes of a primary storage site, a secondary storage site, and a tertiary storage site). In various examples described herein, a virtual storage system 2900 may be run (e.g., on a VM or as a containerized instance, as the case may be) within a public cloud provider (e.g., hyperscaler 2902, 2904). In the context of the present example, the virtual storage system 2900 includes virtual storage nodes 2910 and 2920 and makes use of cloud disks (e.g., hyperscale disks 2915, 2925) provided by the hyperscaler.

The virtual storage system 2900 may present storage over a network to clients 2905 using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 2905 may request services of the virtual storage system 2900 by issuing Input/Output requests 2906, 2907 (e.g., file system protocol messages (in the form of packets) over the network). A representative client of clients 2905 may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the virtual storage system 2900 includes virtual storage nodes 2910 and 2920 with each virtual storage node being shown includes an operating system. The virtual storage node 2910 includes an operating system 2911 having layers 2913 and 2914 of a protocol stack for processing of object storage protocol operations or requests.

The virtual storage node 2920 includes an operating system 2921 layers 2923 and 2924 of a protocol stack for processing of object storage protocol operations or requests.

The storage nodes can include storage device drivers for transmission of messages and data via the one or more links 2960. The storage device drivers interact with the various types of hyperscale disks 2915, 2925 supported by the hyperscalers.

The data served by the virtual storage nodes may be distributed across multiple storage units embodied as persistent storage devices (e.g., non-volatile memory 2940, 2942), including but not limited to HDDs, SSDs, flash memory systems, or other storage devices (e.g., 2915, 2925).

In one embodiment, distributed data storage systems and methods are described for providing common snapshot retention and automatic fanout reconfiguration for an asynchronous leg after a failure event that causes a failover from a primary storage site to a secondary storage site.

According to some embodiments for Example 1, a computer implemented method for providing recover point objective (RPO) protection and common snapshot retention performed by one or more processing resources of a distributed storage system with a primary storage site having a first storage node, a secondary storage site having a second storage node, and a tertiary storage site having a third storage node, the method comprises providing an asynchronous replication relationship with an asynchronous update schedule from one or more storage objects of the first storage node to one or more replicated storage objects of the third storage node, initiating a snapshot create operation to create a snapshot copy of the one or more storage objects of the first storage node based on an asynchronous mirror policy, transferring the snapshot copy to the third storage node based on the asynchronous mirror policy, and intercepting the snapshot create operation on the primary storage site and synchronously replicating the snapshot create operation to transfer the snapshot copy to the second storage node to provide a common snapshot between the second storage node and the third storage node to avoid a baseline data transfer from the second storage node to the third storage node if a failover occurs from the primary storage site to the secondary storage site.

Example 2 includes the subject matter of Example 1, wherein a previous snapshot copy of the one or more replicated storage objects of the second storage node is removed from the second storage node if the snapshot copy is successfully transferred to the second storage node.

Example 3 includes the subject matter of any of Examples 1-2, wherein a previous snapshot copy of the one or more replicated storage objects of the second storage node is maintained in the second storage node if the snapshot copy is not successfully transferred to the second storage node.

Example 4 includes the subject matter of any of Examples 1-3, further comprises providing a synchronous replication relationship with a first update schedule from one or more storage objects of the first storage node to one or more replicated storage objects of the second storage node and initiating, with the second update schedule, a new snapshot create operation with a new snapshot copy for the one or more storage objects of the first storage node when a sync engine is not active due to the synchronous replication relationship being Out-of-Sync.

Example 5 includes the subject matter of any of Examples 1-4, further comprises performing a resync operation when the synchronous replication relationship is Out-of-Sync and transferring the new snapshot copy to the second storage node ensuring that common snapshots are in place when the synchronous replication relationship reaches Insync and is ready for disaster recovery.

Example 6 includes the subject matter of any of Examples 1-5, wherein the primary and secondary storage sites are located in a first region and the tertiary storage site is located in a second region for cloud resident datasets.

Example 7 includes the subject matter of any of Examples 1-6, wherein the failover comprises an automatic unplanned failover (AUFO) that is caused by a failure event for the primary storage site.

Some embodiments relate to Example 8 that includes a multi-site distributed storage system to provide recover point objective (RPO) protection and common snapshot retention including a primary storage site having a first storage node, a secondary storage site having a second storage node, and a tertiary storage site having a third storage node. The storage system comprises a processing resource and a non-transitory computer-readable medium coupled to the processing resource, having stored therein instructions, which when executed by the processing resource cause the processing resource to provide an asynchronous replication relationship with an asynchronous update schedule from one or more storage objects of the first storage node to one or more replicated storage objects of the third storage node, initiate a snapshot create operation to create a snapshot copy of the one or more storage objects of the first storage node based on an asynchronous mirror policy, transfer the snapshot copy to the third storage node based on the asynchronous mirror policy, and intercept the snapshot create operation on the primary storage site and synchronously replicating the snapshot create operation to transfer the snapshot copy to the second storage node to provide a common snapshot between the second storage node and the third storage node to avoid a baseline data transfer from the second storage node to the third storage node if a failover occurs from the primary storage site to the secondary storage site.

Example 9 includes the subject matter of Example 8, wherein a previous snapshot copy of the one or more replicated storage objects of the second storage node is removed from the second storage node if the snapshot copy is successfully transferred to the second storage node.

Example 10 includes the subject matter of any of Examples 8-9, wherein a previous snapshot copy of the one or more replicated storage objects of the second storage node is maintained in the second storage node if the snapshot copy is not successfully transferred to the second storage node.

Example 11 includes the subject matter of any of Examples 8-10, wherein the instructions when executed by the processing resource cause the processing resource to provide a synchronous replication relationship with a synchronous update schedule from one or more storage objects of the first storage node to one or more replicated storage objects of the second storage node, initiate, with the asynchronous update schedule, a new snapshot create operation with a new snapshot copy for the one or more storage objects of the first storage node when a sync engine is not active due to the synchronous replication relationship being Out-of-Sync.

Example 12 includes the subject matter of any of Examples 8-11, wherein the instructions when executed by the processing resource cause the processing resource to perform a resync operation when the synchronous replication relationship is Out-of-Sync and transfer the new snapshot copy to the second storage node ensuring that common snapshots are in place when the synchronous replication relationship reaches Insync and is ready for disaster recovery.

Example 13 includes the subject matter of any of Examples 8-12, wherein the asynchronous update schedule has a same schedule as the synchronous update schedule of the synchronous replication relationship.

Example 14 includes the subject matter of any of Examples 8-13, wherein the failover comprises an automatic unplanned failover (AUFO) that is caused by a failure event for the primary storage site.

Some embodiments relates to Example 15 that includes a non-transitory computer-readable storage medium embodying a set of instructions, which when executed by a processing resource for providing recover point objective (RPO) protection and common snapshot retention cause the processing resource to provide an asynchronous replication relationship with an asynchronous update schedule from one or more storage objects of a first storage node of a primary storage site to one or more replicated storage objects of a third storage node of a tertiary storage site, initiate a snapshot create operation to create a snapshot copy of the one or more storage objects of the first storage node based on an asynchronous mirror policy, transfer the snapshot copy to the third storage node based on the asynchronous mirror policy, and intercept the snapshot create operation on the primary storage site and synchronously replicate the snapshot create operation to transfer the snapshot copy to a second storage node of a secondary storage site to provide a common snapshot between the second storage node and the third storage node to avoid a baseline data transfer from the second storage node to the third storage node if a failover occurs from the primary storage site to the secondary storage site.

Example 16 includes the subject matter of Example 15, wherein a previous snapshot copy of the one or more replicated storage objects of the second storage node is removed from the second storage node if the snapshot copy is successfully transferred to the second storage node.

Example 17 includes the subject matter of any of Examples 15-16, wherein a previous snapshot copy of the one or more replicated storage objects of the second storage node is maintained in the second storage node if the snapshot copy is not successfully transferred to the second storage node.

Example 18 includes the subject matter of any of Examples 15-17, wherein the instructions when executed by the processing resource cause the processing resource to provide a synchronous replication relationship with a synchronous update schedule from one or more storage objects of the first storage node to one or more replicated storage objects of the second storage node and initiate, with the synchronous update schedule, a new snapshot create operation with a new snapshot copy for the one or more storage objects of the first storage node when a sync engine is not active due to the synchronous replication relationship being Out-of-Sync.

Example 19 includes the subject matter of any of Examples 15-18, wherein the instructions when executed by the processing resource cause the processing resource to perform a resync operation when the synchronous replication relationship is Out-of-Sync, and transfer the new snapshot copy to the second storage node ensuring that common snapshots are in place when the synchronous replication relationship reaches Insync and is ready for disaster recovery.

Example 20 includes the subject matter of any of Examples 15-19, wherein the failover comprises an automatic unplanned failover (AUFO) that is caused by a failure event for the primary storage site.

Some embodiments relate to Example 21 that includes a computer-implemented method performed by one or more processors of a multi-site distributed storage system with a primary storage site having a first storage node, a secondary storage site having a second storage node, and a tertiary storage site having a third storage node, the method comprises providing a synchronous replication relationship from one or more storage objects of the first storage node to one or more replicated storage objects of the second storage node, providing an asynchronous replication relationship or mirror vault policy with an asynchronous update schedule from the one or more storage objects of the first storage node to one or more replicated storage objects of the third storage node to provide a protection configuration, tracking, with the third storage node of the tertiary site, a state of the secondary storage site, automatically performing a failover from the primary storage site to the secondary storage site and activating a synchronous mirror copy for the one or more replicated storage objects of the second storage node based upon detecting the failure event for the primary storage site, and automatically initiating realignment and reconfiguration of the protection configuration to the tertiary storage site based upon the state of the secondary storage site.

Example 22 includes the subject matter of Example 21, further comprises initiating the asynchronous update schedule and detecting that the primary storage site is unreachable due to the failure event and initiating a communication from the tertiary storage site to the secondary storage site based on detecting that the primary storage site is unreachable.

Example 23 includes the subject matter of any of Examples 21-22, further comprises automatically configuring a synchronous replication relationship from the second storage node as a source to the first storage node as a destination based on the automated failover.

Example 24 includes the subject matter of any of Examples 21-23, further comprises automatically configuring an asynchronous replication relationship from the second storage node as a source to the third storage node as a destination based on obtaining a cluster identifier from the secondary storage site.

Example 25 includes the subject matter of any of Examples 21-24, wherein the realignment and protection configuration from the secondary storage site to the tertiary storage site occurs based on detection of activating a synchronous mirror copy for the one or more replicated storage objects of the second storage node.

Example 26 includes the subject matter of any of Examples 21-25, wherein the primary and secondary storage sites are located in a first region and the tertiary storage site is located in a second region for cloud resident datasets.

Example 27 includes the subject matter of any of Examples 21-26, wherein the failover comprises an automatic unplanned failover (AUFO) from the primary storage site to the secondary storage site.

Some embodiments relate to Example 28 that includes a multi-site distributed storage system including a primary storage site having a first storage node, a secondary storage site having a second storage node, and a tertiary storage site having a third storage node comprising a processing resource and a non-transitory computer-readable medium coupled to the processing resource, having stored therein instructions, which when executed by the processing resource cause the processing resource to provide a synchronous replication relationship from one or more storage objects of the first storage node to one or more replicated storage objects of the second storage node, provide an asynchronous replication relationship or mirror vault policy with an asynchronous update schedule from the one or more storage objects of the first storage node to one or more replicated storage objects of the third storage node to provide a protection configuration, track, with the third storage node of the tertiary site, a state of the secondary storage site, automatically perform a failover from the primary storage site to the secondary storage site and activating a synchronous mirror copy for the one or more replicated storage objects of the second storage node based upon detecting the failure event for the primary storage site, and automatically initiate realignment and reconfiguration of the protection configuration to the tertiary storage site based upon the state of the secondary storage site.

Example 29 includes the subject matter of Example 28, wherein the instructions when executed by the processing resource cause the processing resource to initiate the asynchronous update schedule and detecting that the primary storage site is unreachable due to the failure event, and initiate a communication from the tertiary storage site to the secondary storage site based on detecting that the primary storage site is unreachable.

Example 30 includes the subject matter of any of Examples 28-29, wherein the instructions when executed by the processing resource cause the processing resource to automatically configure a synchronous replication relationship from the second storage node as a source to the first storage node as a destination based on the automated failover.

Example 31 includes the subject matter of any of Examples 28-30, wherein the instructions when executed by the processing resource cause the processing resource to automatically configure an asynchronous replication relationship from the second storage node as a source to the third storage node as a destination based on obtaining a cluster identifier from the secondary storage site.

Example 32 includes the subject matter of any of Examples 28-31, wherein the realignment and protection configuration from the secondary storage site to the tertiary storage site occurs based on detection of activating a synchronous mirror copy for the one or more replicated storage objects of the second storage node.

Example 33 includes the subject matter of any of Examples 28-32, wherein the realignment and protection configuration comprises an asynchronous replication relationship or mirror vault policy from the secondary storage site to the tertiary storage site.

Example 34 includes the subject matter of any of Examples 28-33, wherein the failover comprises an automatic unplanned failover (AUFO) from the primary storage site to the to the secondary storage site.

Some embodiments relate to Example 35 that includes a non-transitory computer-readable storage medium embodying a set of instructions, which when executed by one or more processing resources of a multi-site distributed storage system cause the one or more processing resources to provide a synchronous replication relationship from one or more storage objects of the first storage node to one or more replicated storage objects of the second storage node, provide an asynchronous replication relationship or mirror vault policy with an asynchronous update schedule from the one or more storage objects of the first storage node to one or more replicated storage objects of the third storage node to provide a protection configuration, track, with the third storage node of the tertiary site, a state of the secondary storage site, automatically perform a failover from the primary storage site to the secondary storage site and activating a synchronous mirror copy for the one or more replicated storage objects of the second storage node based upon detecting the failure event for the primary storage site, and automatically initiate realignment and reconfiguration of the protection configuration to the tertiary storage site based upon the state of the secondary storage site.

Example 36 includes the subject matter of Example 35, wherein the instructions when executed by the one or more processing resources cause the one or more processing resources to initiate the asynchronous update schedule and detecting that the primary storage site is unreachable due to the failure event, and initiate a communication from the tertiary storage site to the secondary storage site based on detecting that the primary storage site is unreachable.

Example 37 includes the subject matter of any of Examples 35-36, wherein the instructions when executed by the one or more processing resources cause the one or more processing resources to automatically configure a synchronous replication relationship from the second storage node as a source to the first storage node as a destination based on the automated failover.

Example 38 includes the subject matter of any of Examples 35-37, wherein the instructions when executed by the one or more processing resources cause the one or more processing resources to automatically configure an asynchronous replication relationship from the second storage node as a source to the third storage node as a destination based on obtaining a cluster identifier from the secondary storage site.

Example 39 includes the subject matter of any of Examples 35-38, wherein the realignment and protection configuration from the secondary storage site to the tertiary storage site occurs based on detection of activating a synchronous mirror copy for the one or more replicated storage objects of the second storage node.

Example 40 includes the subject matter of any of Examples 35-39, wherein the failover comprises an automatic unplanned failover (AUFO) from the primary storage site to the secondary storage site.

What is claimed is:

1. A computer-implemented method performed by one or more processing resources of a multi-site distributed storage system with a primary storage site having a first storage node, a secondary storage site having a second storage node, and a tertiary storage site having a third storage node, the computer-implemented method comprising:

initiating a snapshot create operation to create a snapshot copy of one or more storage objects of the first storage node based on an asynchronous mirror policy from the one or more storage objects of the first storage node to one or more replicated storage objects of the third storage node; and intercepting the snapshot create operation on the primary storage site and synchronously replicating the snapshot create operation to transfer the snapshot copy to the second storage node to provide a common snapshot between the second storage node and the third storage node.

2. The computer-implemented method of claim 1, further comprising:

providing an asynchronous replication relationship with an asynchronous update schedule from the one or more storage objects of the first storage node to one or more replicated storage objects of the third storage node; and transferring the snapshot copy to the third storage node based on the asynchronous mirror policy, wherein a previous snapshot copy of the one or more replicated storage objects of the second storage node is removed from the second storage node if the snapshot copy is successfully transferred to the second storage node.

3. The computer-implemented method of claim 1, wherein a previous snapshot copy of the one or more replicated storage objects of the second storage node is maintained in the second storage node if the snapshot copy is not successfully transferred to the second storage node.

4. The computer-implemented method of claim 1, further comprising:

providing a synchronous replication relationship with a first update schedule from the one or more storage objects of the first storage node to the one or more replicated storage objects of the second storage node; and initiating, with a second update schedule, a new snapshot create operation with a new snapshot copy for the one or more storage objects of the first storage node when a sync engine is not active due to the synchronous replication relationship being Out-of-Sync.

5. The computer-implemented method of claim 4, further comprising:

performing a resync operation when the synchronous replication relationship is Out-of-Sync; and transferring the new snapshot copy to the second storage node ensuring that common snapshots are in place when the synchronous replication relationship reaches Insync and is ready for disaster recovery.

6. The computer-implemented method of claim 1, wherein the primary and secondary storage sites are located in a first region and the tertiary storage site is located in a second region for cloud resident datasets.

7. The computer-implemented method of claim 1, wherein intercepting the snapshot create operation on the primary storage site and synchronously replicating the snapshot create operation to transfer the snapshot copy to the second storage node to provide a common snapshot between the second storage node and the third storage node occurs to avoid a baseline data transfer from the second storage node to the third storage node if a failover occurs from the primary storage site to the secondary storage site, wherein the failover comprises an automatic unplanned failover (AUFO) that is caused by a failure event.

8. A multi-site distributed storage system including a primary storage site having a first storage node, a secondary storage site having a second storage node, and a tertiary storage site having a third storage node comprising:

one or more processing resources; and a non-transitory computer-readable medium coupled to the one or more processing resources, having stored therein instructions, which when executed by the one or more processing resources cause the one or more processing resources to:

initiate a snapshot create operation to create a snapshot copy of one or more storage objects of the first storage node based on an asynchronous mirror policy from the one or more storage objects of the first storage node to one or more replicated storage objects of the third storage node; and intercept the snapshot create operation on the primary storage site and synchronously replicating the snapshot create operation to transfer the snapshot copy to the second storage node to provide a common snapshot between the second storage node and the third storage node.

9. The multi-site distributed storage system of claim 8, wherein the instructions when executed by the one or more processing resources cause the one or more processing resources to:

provide an asynchronous replication relationship with an asynchronous update schedule from the one or more storage objects of the first storage node to one or more replicated storage objects of the third storage node; and transfer the snapshot copy to the third storage node based on the asynchronous mirror policy, wherein a previous snapshot copy of the one or more replicated storage objects of the second storage node is removed from the second storage node if the snapshot copy is successfully transferred to the second storage node.

10. The multi-site distributed storage system of claim 8, wherein a previous snapshot copy of the one or more replicated storage objects of the second storage node is maintained in the second storage node if the snapshot copy is not successfully transferred to the second storage node.

11. The multi-site distributed storage system of claim 8, wherein the instructions when executed by the one or more processing resources cause the one or more processing resources to:

provide a synchronous replication relationship with a synchronous update schedule from the one or more storage objects of the first storage node to the one or more replicated storage objects of the second storage node; and initiate, with an asynchronous update schedule, a new snapshot create operation with a new snapshot copy for the one or more storage objects of the first storage node when a sync engine is not active due to the synchronous replication relationship being Out-of-Sync.

12. The multi-site distributed storage system of claim 11, wherein the instructions when executed by the one or more processing resources cause the one or more processing resources to:

perform a resync operation when the synchronous replication relationship is Out-of-Sync; and transfer the new snapshot copy to the second storage node ensuring that common snapshots are in place when the synchronous replication relationship reaches Insync and is ready for disaster recovery.

13. The multi-site distributed storage system of claim 8, wherein the asynchronous update schedule has a same schedule as the synchronous update schedule of the synchronous replication relationship.

14. The multi-site distributed storage system of claim 8, wherein intercepting the snapshot create operation on the primary storage site and synchronously replicating the snapshot create operation to transfer the snapshot copy to the second storage node to provide a common snapshot between the second storage node and the third storage node occurs to avoid a baseline data transfer from the second storage node to the third storage node if a failover occurs from the primary storage site to the secondary storage site, wherein the failover comprises an automatic unplanned failover (AUFO) that is caused by a failure event.

15. A non-transitory computer-readable storage medium embodying a set of instructions, which when executed by one or more processing resources cause the one or more processing resources to:

initiate a snapshot create operation to create a snapshot copy of one or more storage objects of a first storage node based on an asynchronous mirror policy from the one or more storage objects of the first storage node to one or more replicated storage objects of a third storage node; and intercept the snapshot create operation on the first storage node of a primary storage site and synchronously replicate the snapshot create operation to transfer the snapshot copy to a second storage node of a secondary storage site to provide a common snapshot between the second storage node and the third storage node.

16. The non-transitory computer-readable storage medium of claim 15, wherein the instructions when executed by the one or more processing resources cause the one or more processing resources to:

provide an asynchronous replication relationship with an asynchronous update schedule from the one or more storage objects of the first storage node to one or more replicated storage objects of the third storage node; and transfer the snapshot copy to the third storage node based on the asynchronous mirror policy, wherein a previous snapshot copy of the one or more replicated storage objects of the second storage node is removed from the second storage node if the snapshot copy is successfully transferred to the second storage node.

17. The non-transitory computer-readable storage medium of claim 15, wherein a previous snapshot copy of the one or more replicated storage objects of the second storage node is maintained in the second storage node if the snapshot copy is not successfully transferred to the second storage node.

18. The non-transitory computer-readable storage medium of claim 15, wherein the instructions when executed by the one or more processing resources cause the one or more processing resources to:

provide a synchronous replication relationship with a synchronous update schedule from the one or more storage objects of the first storage node to the one or more replicated storage objects of the second storage node; and initiate, with an asynchronous update schedule, a new snapshot create operation with a new snapshot copy for the one or more storage objects of the first storage node when a sync engine is not active due to the synchronous replication relationship being Out-of-Sync.

19. The non-transitory computer-readable storage medium of claim 18, wherein the instructions when executed by the one or more processing resources cause the one or more processing resources to:

perform a resync operation when the synchronous replication relationship is Out-of-Sync; and transfer the new snapshot copy to the second storage node ensuring that common snapshots are in place when the synchronous replication relationship reaches Insync and is ready for disaster recovery.

20. The non-transitory computer-readable storage medium of claim 15, wherein intercepting the snapshot create operation on the primary storage site and synchronously replicating the snapshot create operation to transfer the snapshot copy to the second storage node to provide a common snapshot between the second storage node and the third storage node occurs to avoid a baseline data transfer from the second storage node to the third storage node if a failover occurs from the primary storage site to the secondary storage site, wherein the failover comprises an automatic unplanned failover (AUFO) that is caused by a failure event.

* * * * *